(12) United States Patent
Hatanaka

(10) Patent No.: US 6,922,510 B2
(45) Date of Patent: Jul. 26, 2005

(54) SPIRALING OPTICAL DEVICE

(75) Inventor: Takaaki Hatanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 10/219,326

(22) Filed: Aug. 16, 2002

(65) Prior Publication Data

US 2003/0035609 A1 Feb. 20, 2003

(30) Foreign Application Priority Data

Aug. 16, 2001 (JP) ........................................ 2001-247431
Sep. 28, 2001 (JP) ........................................ 2001-301517

(51) Int. Cl.[7] .......................... G02B 6/125; G02B 6/24; G02B 6/287; G02F 1/025
(52) U.S. Cl. ............................. 385/50; 385/37; 385/39; 385/40
(58) Field of Search ........................... 385/50, 129–132, 385/37, 40, 9

(56) References Cited

U.S. PATENT DOCUMENTS

| | | | | |
|---|---|---|---|---|
| 5,289,256 A | * | 2/1994 | Gramling | 356/477 |
| 5,513,285 A | * | 4/1996 | Kawashima et al. | 385/16 |
| 5,521,992 A | * | 5/1996 | Chun et al. | 385/14 |
| 5,701,372 A | * | 12/1997 | Magel et al. | 385/24 |
| 5,926,589 A | * | 7/1999 | Gaeta | 385/16 |
| 5,933,554 A | * | 8/1999 | Leuthold et al. | 385/28 |
| 5,953,468 A | * | 9/1999 | Finnila et al. | 385/16 |
| 6,167,168 A | * | 12/2000 | Dieckroeger et al. | 385/3 |
| 6,285,809 B1 | * | 9/2001 | Nir et al. | 385/17 |
| 6,445,843 B1 | * | 9/2002 | Duer | 385/17 |
| 6,684,009 B2 | * | 1/2004 | Ueda | 385/37 |
| 2003/0012479 A1 | * | 1/2003 | Kitou et al. | 385/14 |

FOREIGN PATENT DOCUMENTS

| | | |
|---|---|---|
| JP | 58-59205 | 4/1983 |
| JP | 01-191803 | 8/1989 |
| JP | 05-181028 | 7/1993 |
| JP | 08-279646 | 10/1996 |
| JP | 2001-109022 | 4/2001 |

* cited by examiner

*Primary Examiner*—David V. Bruce
*Assistant Examiner*—Krystyna Suchecki
(74) *Attorney, Agent, or Firm*—McGinn & Gibb, PLLC

(57) ABSTRACT

An optical device includes at least one kind of and a plurality of optical circuits optically connected in series wherein the optical circuits are arranged in a spiral on a common substrate.

32 Claims, 31 Drawing Sheets

SPIRALING OPTICAL DEVICE

BACKGROUND OF THE INVENTION

1. Field of the Invention

The invention relates to an optical device, and more particularly to an optical device comprised of an optical unit or a modularized optical unit which optical unit includes a plurality of optical circuits such as a Mach-Zehnder interferometer.

2. Description of the Related Art

It is necessary in a light transmission system to densify an interval between channels or increase a transmission rate in order to increase transmission capacity. A light communication system satisfying such requirement would have to include various optical devices such as a device for merging wavelengths of optical signals into one another or separating a wavelength of an optical signal from merged wavelengths, a device for compensating for dispersion, or a gain equalizer used for an optical fiber amplifier.

Some devices among those optical devices have an optical circuit which is designed to have multi-stages by virtue of planar lightwave circuit (PLC) technology. As an example of such devices, hereinafter is explained a Mach-Zehnder interferometer type optical circuit.

FIG. 1 illustrates a structure of a Mach-Zehnder interferometer type optical circuit fabricated on a substrate.

The illustrated Mach-Zehnder interferometer type optical circuit 11 is an asymmetric Mach-Zehnder interferometer type optical circuit. The asymmetric Mach-Zehnder interferometer type optical circuit 11 fabricated on a substrate 12 is comprised of a shorter arm 13, a longer arm 14 arranged above the shorter arm 13, a first directional coupler $15_1$ optically connected to inputs of the arms 13 and 14, and a second directional coupler $15_2$ optically connected to outputs of the arms 13 and 14.

A multi-mode interference (MMI) coupler may be used in place of the directional couplers $15_1$ and $15_2$.

The asymmetric Mach-Zehnder interferometer type optical circuit 11 is designed to receive an optic signal through one or all of first and second optic waveguides 16 and 17, and output a desired optic signal. It is assumed hereinafter that the asymmetric Mach-Zehnder interferometer type optical circuit 11 is used as a device for merging wavelengths of optic signals into one wavelength or a device for separating an optic wavelength from merged wavelengths.

Herein, it is assumed that the asymmetric Mach-Zehnder interferometer type optical circuit 11 receives a forty-channel optic signal 18 through the second optic waveguide 17.

The first directional coupler $15_1$ divides the optic signal 18 into two forty-channel signals 21 and 22, and then, transmits the thus divided signals 21 and 22 to the longer arm 14 and the shorter arm 13, respectively. The forty-channel signals 21 and 22 enters the second directional coupler $15_2$ through the longer arm 14 and the shorter arm 13, and then, interfere with each other in the second directional coupler $15_2$ by a phase difference equivalent to a difference in length between the longer arm 14 and the shorter arm 13.

As a result, the first optic waveguide 16 outputs an optic signal 23 having K-th channels (wavelengths) including second to fortieth channels wherein K is an even integer, and the second optic waveguide 17 outputs an optic signal 24 having M-th channels (wavelengths) including first to thirty-ninth channels wherein M is an odd integer.

Though the asymmetric Mach-Zehnder interferometer type optical circuit 11 illustrated in FIG. 1 is of a single stage, a Mach-Zehnder interferometer type optical circuit may be designed to have a plurality of stages optically connected to one another. A Mach-Zehnder interferometer type optical circuit having a plurality of stages could have enhanced characteristics as an optical filter by varying parameters, or could have complex functions.

There has been suggested an optic finite impulse response (FIR) filter comprised of a plurality of Mach-Zehnder interferometers optically connected to one another in multi-stages, and a plurality of phase-shifters through which the Mach-Zehnder interferometers are optically connected to one another.

FIG. 2 illustrates an optical device including a plurality of Mach-Zehnder interferometer type optical circuits arranged horizontally in a line.

The illustrated optical device is comprised of N pairs of arms, and first to (N+1)-th directional couplers $15_1$ to $15_{(N+1)}$ through each of which adjacent pair of arms is optically connected to each other. Each pair of arms is comprised of a shorter arm $13_1$ to $13_N$ and a longer arm $14_1$ to $14_N$.

It is not always necessary for the shorter arms $13_1$ to $13_N$ to be equal to one another in N pairs, and similarly, it is not always necessary for the longer arms $14_1$ to $14_N$ to be equal to one another in N pairs, because a difference in length between the shorter and longer arms in each of N pairs defines a phase difference.

The first to (N+1)-th directional couplers $15_1$ to $15_{(N+1)}$ are horizontally directed, that is, in a direction in which a light goes on.

The optical device illustrated in FIG. 2, including the Mach-Zehnder interferometer type optical circuits arranged horizontally in a line, is accompanied with a problem that the optical device unavoidably is horizontally too long with the result in an increase in a size of the optical device. Accordingly, a yield at which optical devices can be fabricated from a substrate would be reduced.

FIG. 3 illustrates an optical device including a plurality of optical circuits arranged for increasing a yield.

In the illustrated optical device, the shorter arms $13_1$ to $13_N$ and the longer arms $14_1$ to $14_N$ are designed to be bent in the same direction in each of N pairs, but the shorter and longer arms in adjacent pairs are designed to be bent in opposite directions. The first to (N+1)-th directional couplers $15_1$ to $15_{(N+1)}$ through which adjacent pairs of the shorter and longer arms are optically connected to each other are vertically directed, that is, in a direction perpendicular to a direction in which the N pairs of the shorter and longer arms are optically connected to one another.

As is understood soon in view of FIG. 3, the optical device has a zigzag shape, and is shortened in a horizontal length in equivalence to an increase in a vertical length in comparison with the optical device illustrated in FIG. 2.

However, even in the optical device illustrated in FIG. 3, including a plurality of the Mach-Zehnder interferometer type optical circuits arranged in a zigzag configuration, the optical device would unavoidably have an increased horizontal length if the optical device had an increased number of the Mach-Zehnder interferometer type optical circuits. This results in reduction in a yield at which optical devices are diced out of a substrate, similarly to the optical device illustrated in FIG. 2. The reduction in such a yield results in an increase in fabrication costs of an optical device.

In addition, since a substrate has unevenness in a profile of an index of refraction, there is unevenness in characteristics in different areas of the substrate. Hence, the optical device is accompanied further with a problem that it is more difficult to ensure constant quality in optical devices, if those optical devices were to be diced out of a substrate having a larger size.

Though the problems in a Mach-Zehnder interferometer type optical circuit as an example have been explained above, an optical device comprised of a single or a plurality of circuit(s) formed on a common substrate and optically connected to one another would be accompanied with the same problems as mentioned above.

Japanese Unexamined Utility Model Publication No. 58-59205 (U) has suggested a directional coupler having a coupling area sandwiched between two micro-strip paths which coupling area has a length of ¼ wavelength. The two micro-strip paths are formed on a dielectric substrate in a spiral. Coupling areas are formed at opposite sides of at least a part of the micro-strip paths.

Japanese Unexamined Patent Publication No. 1-191803 (A) has suggested an optic gyro including a glass substrate or an optic monocrystal substrate, and an optic waveguide formed on the substrate in a spiral. The optic waveguide has leading and trailing edges at an outer edge of the substrate.

Japanese Unexamined Patent Publication No. 5-181028 (A) has suggested an optic ring oscillator including a ring-shaped optic path, optic couplers, and at least one optic input and output path optically connected to the ring-shaped optic path through the optic couplers. At least one of the optic couplers can vary an intensity of input and output optic signals.

Japanese Unexamined Patent Publication No. 8-279646 (A) has suggested a pulse-light source including a light waveguide circuit having two inputs and two outputs and comprised of two light waveguides having portions arranged close to each other, and a plurality of directional couplers arranged in the portions, a phase-modulator optically connected to one of the two inputs, and a laser optically connected to the phase-modulator. The light waveguide circuit includes a plurality of first waveguide areas in each of which the two light waveguides are equal in length to each other and a second waveguide area in which the two light waveguides are not equal in length to each other. The second waveguide area is optically connected to at least one first waveguide area both at a side close to the laser and at a side remoter from the laser.

Japanese Unexamined Patent Publication No. 2001-109022 (A) has suggested an add-drop filter including a plurality of Mach-Zehnder interferometers having two inputs and two outputs and including two directional couplers or 2×2 MMI couplers through which two light waveguides formed close to each other on a substrate are optically connected to each other. Each of the Mach-Zehnder interferometers is designed to include an optically inductive grating or a heater in at least one of arms of the light waveguides sandwiched between the directional couplers or the 2×2 MMI couplers.

SUMMARY OF THE INVENTION

In view of the above-mentioned problems in the conventional optical circuits, it is an object of the present invention to provide an optical device which is capable of reducing a space for arranging therein a plurality of optical circuits optically connected to one another in multi-stages on a common substrate.

In one aspect of the present invention, there is provided an optical device including at least one kind of and a plurality of optical circuits optically connected in series wherein at least a part of the optical circuits is arranged in a spiral on a common substrate.

In the optical device in accordance with the above-mentioned present invention, a single kind of and a plurality of optical circuits are formed on a common substrate, and at least a part of the optical circuits are arranged in a spiral. As an alternative, a plurality kinds of optical circuits are formed on a common substrate, and at least a part of the optical circuits are arranged in a spiral. By arranging at least a part of the optical circuits in a spiral, it is possible to increase a density at which optical circuits are arranged horizontally and vertically of a substrate, and accordingly, arrange the optical circuits in a smaller space.

There is further provided an optical device including a plurality of optical circuits having the same structure and optically connected in series wherein at least a part of the optical circuits is arranged in a spiral on a common substrate.

In the optical device in accordance with the above-mentioned present invention, a plurality of optical circuits having the same structure as one another is formed on a common substrate, and at least a part of the optical circuits are arranged in a spiral. By arranging at least a part of the optical circuits in a spiral, it is possible to increase a density at which optical circuits are arranged horizontally and vertically of a substrate, and accordingly, arrange the optical circuits in a smaller space.

There is still further provided an optical device including at least one kind of and a plurality of optical circuits optically connected in series wherein the optical circuits are arranged in a spiral on a common substrate.

In the optical device in accordance with the above-mentioned present invention, at least one kind of and a plurality of optical circuits are formed on a common substrate, and the optical circuits are arranged in a spiral. By arranging the optical circuits in a spiral, it is possible to increase a density at which optical circuits are arranged horizontally and vertically of a substrate, and accordingly, arrange the optical circuits in a smaller space.

There is yet further provided an optical device including a plurality of optical circuits having the same structure and optically connected in series wherein the optical circuits are arranged in a spiral on a common substrate.

In the optical device in accordance with the above-mentioned present invention, a plurality of optical circuits having the same structure as one another is formed on a common substrate, and the optical circuits are arranged in a spiral. By arranging at least a part of the optical circuits in a spiral, it is possible to increase a density at which optical circuits are arranged horizontally and vertically of a substrate, and accordingly, arrange the optical circuits in a smaller space.

Each of the optical circuits may be comprised of a Mach-Zehnder interferometer including a waveguide, and a coupler through which the waveguide is optically connected to a waveguide in a next-stage Mach-Zehnder interferometer, the waveguide defining two arms having different lengths from each other.

For instance, the coupler may be comprised of a directional coupler or a multi-mode interference (MMI) coupler.

It is preferable that at least a part of couplers in the optical circuits are arranged to be close to one another.

By arranging at least a part of couplers in the optical circuits to be close to one another, it would be possible to set a single trimming area used for compensating for errors in characteristics in a plurality of optical circuits, or arrange a heater electrode used for doing the same.

It is preferable that a waveguide optically connected to an optical circuit located closest to a center of the spiral intersects with other waveguides at an angle of 90 degrees or almost 90 degrees.

In the optical device in accordance with the present invention, since the optical circuits are arranged in a spiral, when an input waveguide and an output waveguide are designed to have ends at an edge of a substrate, the input and output waveguides may intersect with each other on a substrate. By arranging the waveguides to intersect with each other at angle of 90 degrees or almost 90 degrees, it would be possible to reduce optical loss or reduce a rate at which a light leaks to another waveguide.

The optical device may further include a plurality of phase-shifters through each of which the coupler in an optical circuit is optically connected to the coupler in a next-stage optical circuit, such that the optical device acts as an optical finite impulse response (FIR) filter.

It is preferable that an input waveguide optically connected to a first-stage optical circuit has an end at an edge of the substrate, and an output waveguide optically connected to a final-stage optical circuit has ends at the same edge of the substrate as the edge.

In the optical device in accordance with the present invention, at least a part of the optical circuits is arranged in a spiral, it would be possible to arrange one ends of the optical circuits at an edge of a substrate. Accordingly, when an optical fiber is to be connected to a substrate, the optical fiber may be connected to the substrate only at an edge thereof, ensuring reduction in a size of an optical device or a modularized optical device.

It is preferable that the end of the input waveguide and the ends of the output waveguide are arranged close to each other at the edge of the substrate.

The end of the input waveguide and the ends of the output waveguide are arranged not only at a common edge of a substrate, but also close to each other. Accordingly, an optical signal can be input into or output from a substrate by optically connecting a single optical fiber array including a plurality of optical fibers in a bundle, to the substrate.

It is preferable that the end of the input waveguide and the ends of the output waveguide are equally spaced away from one another.

It is preferable that the couplers are located in a trimming region used for compensating for a characteristic of each of the optical circuits.

It is considered that directional couplers arranged close to each other have similar deviation from designed characteristics even in a common substrate. Accordingly, the directional couplers are necessary to be compensated for in the same degree. Hence, when characteristics of directional couplers is compensated for, for instance, by varying an optically inductive index of refraction, or temporarily applying heat thereto, it would be possible to concurrently compensate for characteristics of directional couplers arranged close to each other. Thus, a region in which directional couplers are arranged close to each other may be determined as a trimming region.

The optical device may further include a heater electrode for commonly heating optical circuits located adjacent to each other in a radial direction of the spiral.

It is considered that optical circuits arranged such that their spiral waveguides are located adjacent to each other have similar deviation from designed characteristics even in a common substrate. Accordingly, the optical circuits are necessary to be compensated for in the same degree. Hence, when the optical circuits are compensated for by temporarily applying heat thereto, it would be possible to concurrently apply heat to the optical circuits commonly through the use of a single heater electrode.

The optical device may further include an optical fiber through which an optic signal is input into and output from the optical circuits and which is optically connected to the substrate at the edge.

When input and output waveguides are designed to have ends at an edge of a substrate, an optical fiber through which an optic signal is input into and output from the optical circuits may be optically connected to the substrate at the edge. This ensures reduction in a size of a modularized optical circuit.

It is preferable that the optical device has a plurality of substrates, an input waveguide optically connected to a first-stage optical circuit has an end at an edge of each of the substrates, an output waveguide optically connected to a final-stage optical circuit has an end at the same edge of each of the substrates as the edge, and an input waveguide in a first substrate among the substrates is optically connected to an output waveguide in a second substrate among the substrates.

It would be no longer necessary to use an optical fiber array, since a plurality of substrates is directly connected to one another. In addition, the optical circuit can be fabricated in a smaller size to such a degree equivalent to an optical fiber array.

For instance, each of the waveguide may be designed to define a half of the spiral.

For instance, each of the two arms may be comprised of a first quarter-circular portion, a linear portion connected at its first end to the first quarter-circular portion, and a second quarter-circular portion connected to the linear portion at a second end thereof.

The optical device may further include an arcuate arrayed waveguide, and wherein one of the optical circuits is arranged coaxially with the arcuate arrayed waveguide.

It is preferable that each of the optical circuits is formed on a separate substrate, and the optical circuits are optically connected to one another.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 4:
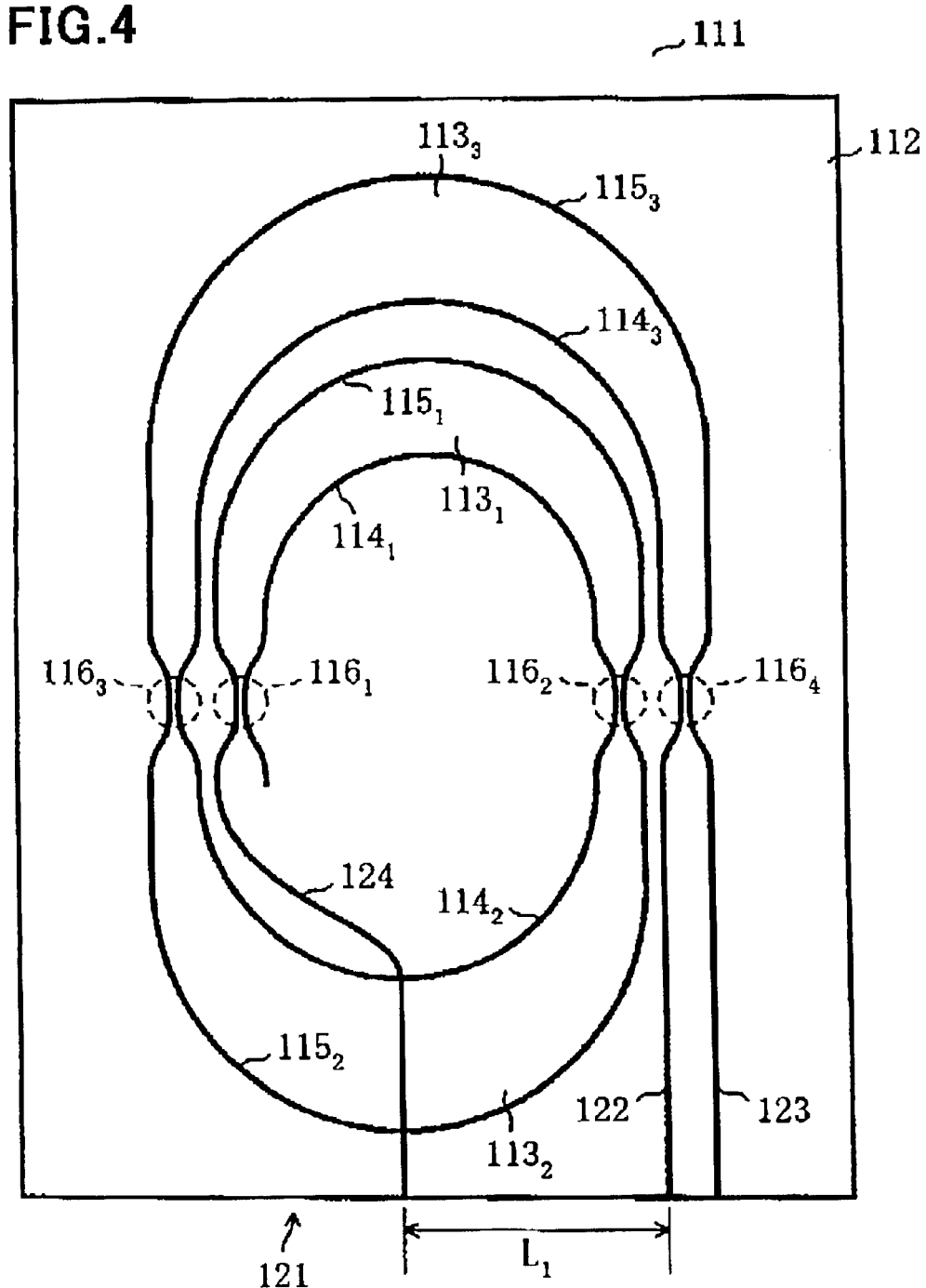
FIG. 4 is a plan view of an optical device in accordance with the first embodiment of the present invention.

FIG. 4 is a plan view of an optical device in accordance with the first embodiment of the present invention.

The optical device in accordance with the first embodiment includes a Mach-Zehnder interferometer type optical circuit 111 comprised of a substrate 112, first to third asymmetric Mach-Zehnder interferometer type optical circuit $113_1$, $113_2$ and $113_3$, and first to fourth directional couplers $116_1$, $116_2$, $116_3$ and $116_4$.

The first to third asymmetric Mach-Zehnder interferometer type optical circuit $113_1$, $113_2$ and $113_3$ are optically connected in series and arranged in a spiral.

The first asymmetric Mach-Zehnder interferometer type optical circuit $113_1$ located closest to a center of the spiral is designed to have a shorter arm $114_1$ and a longer arm $115_1$, and is optically connected to an input waveguide 124 through the first directional coupler $116_1$ and further to the second asymmetric Mach-Zehnder interferometer type optical circuit $113_2$ through the second directional coupler $116_2$.

The second asymmetric Mach-Zehnder interferometer type optical circuit $113_2$ is designed to have a shorter arm $114_2$ and a longer arm $115_2$, and is optically connected to an output of the first asymmetric Mach-Zehnder interferometer type optical circuit $113_1$ through the second directional coupler $116_2$ and further to the third asymmetric Mach-Zehnder interferometer type optical circuit $113_3$ through the third directional coupler $116_3$.

The third asymmetric Mach-Zehnder interferometer type optical circuit $113_3$ is designed to have a shorter arm $114_3$ and a longer arm $115_3$, and is optically connected to an output of the second asymmetric Mach-Zehnder interferometer type optical circuit $113_2$ through the third directional coupler $116_3$ and further to output waveguides 122 and 123 through the fourth directional coupler $116_4$.

The shorter arms $114_1$ to $114_3$ are different in length from one another, and similarly, the longer arms $115_1$ to $115_3$ are different in length from one another. A difference in length between each of the shorter arms $114_1$ to $114_3$ and each of the longer arms $115_1$ to $115_3$ is determined to define desired characteristics of the first to third Mach-Zehnder interferometer type optical circuits $113_1$ to $113_3$.

As illustrated in FIG. 4, the first and third directional couplers $116_1$ and $116_3$ are located close to each other, and the second and fourth directional couplers $116_2$ and $116_4$ are located close to each other. Since the first to third asymmetric Mach-Zehnder interferometer type optical circuit $113_1$ to $113_3$ are designed to define a half of the spiral, an input of the first directional coupler $116_1$ and an output of the fourth directional coupler $116_4$ are directed to an edge 121 of the substrate 112. Accordingly, the output waveguides 122 and 123 optically connected to the output of the fourth directional coupler $116_4$ can be arranged to have one ends at the edge of the substrate 112.

The input waveguide 124 optically connected at one end thereof to an input port of the first directional coupler $116_1$ is arranged to intersect with the shorter arm $114_2$ and the longer arm $115_2$ of the second asymmetric Mach-Zehnder interferometer type optical circuit $113_2$, and hence, the input waveguide 124 has the other end at the edge 121 of the substrate 112.

The input waveguide 124 is designed to intersect with the shorter arm $114_2$ or the longer arm $115_2$ of the second asymmetric Mach-Zehnder interferometer type optical circuit $113_2$ at an angle of 90 degrees or almost 90 degrees. If the input waveguide 124 intersects with the shorter arm $114_2$ or the longer arm $115_2$ at an angle much greater or smaller than 90 degrees, optical loss would be generated, and/or an optic signal marching on through one of the waveguides would leak into the other waveguide at a high rate.

As explained above, in the Mach-Zehnder interferometer type optical circuit 111 in accordance with the first embodiment, the input waveguide 124 and the output waveguides 122 and 123 can be designed to have ends at the edge 121 of the substrate 112. This provides a big advantage in designing an optical device.

It is assumed herein that the optical device in accordance with the first embodiment is optically connected to another optical device (not illustrated) for modularization.

Figure 1:
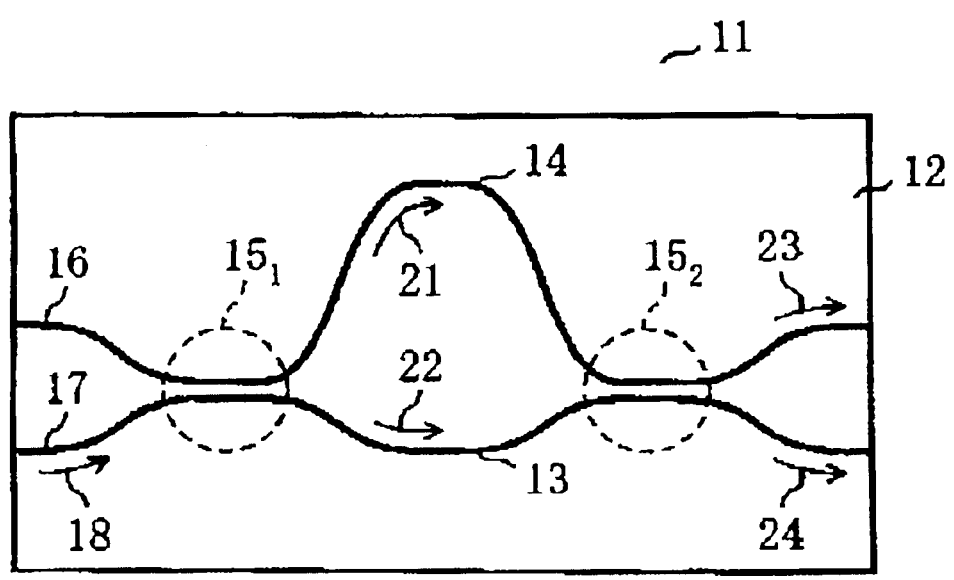
FIG. 1 is a plan view of a conventional optical device comprised of a single-stage Mach-Zehnder interferometer type optical circuit.
Figure 2:
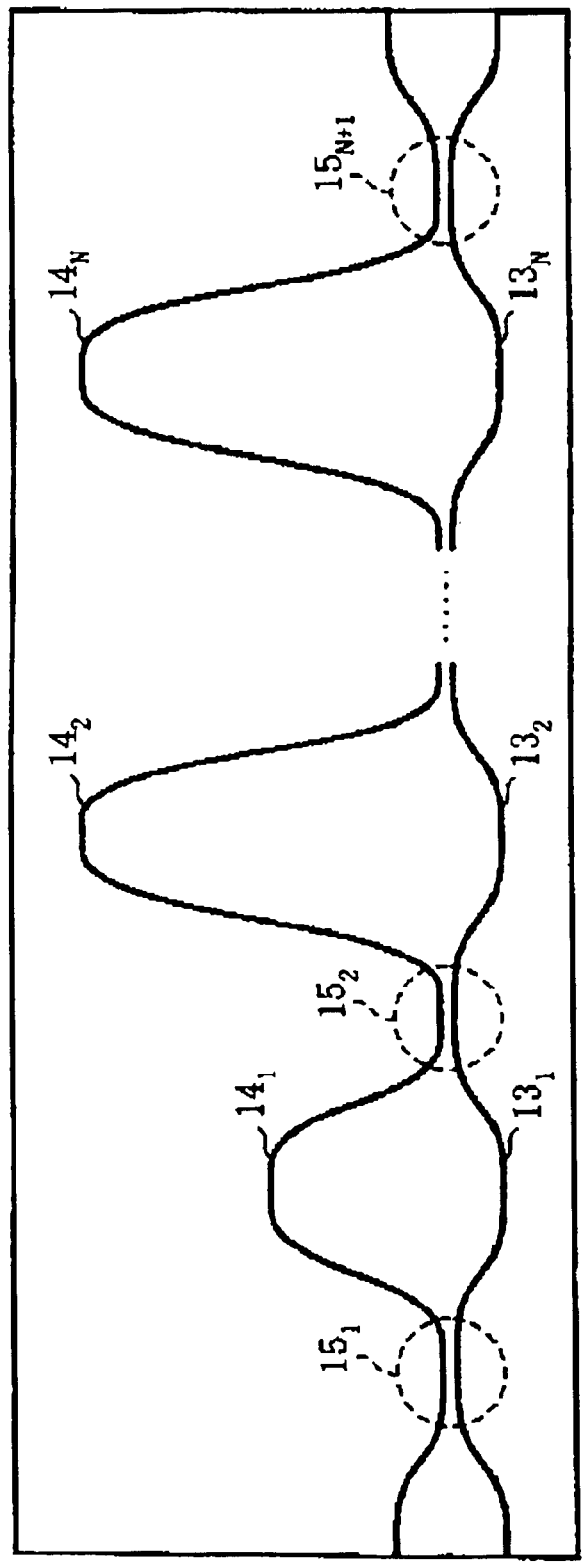
FIG. 2 is a plan view of a conventional optical device comprised of a plurality of Mach-Zehnder interferometer type optical circuits arranged horizontally in a line.
Figure 3:
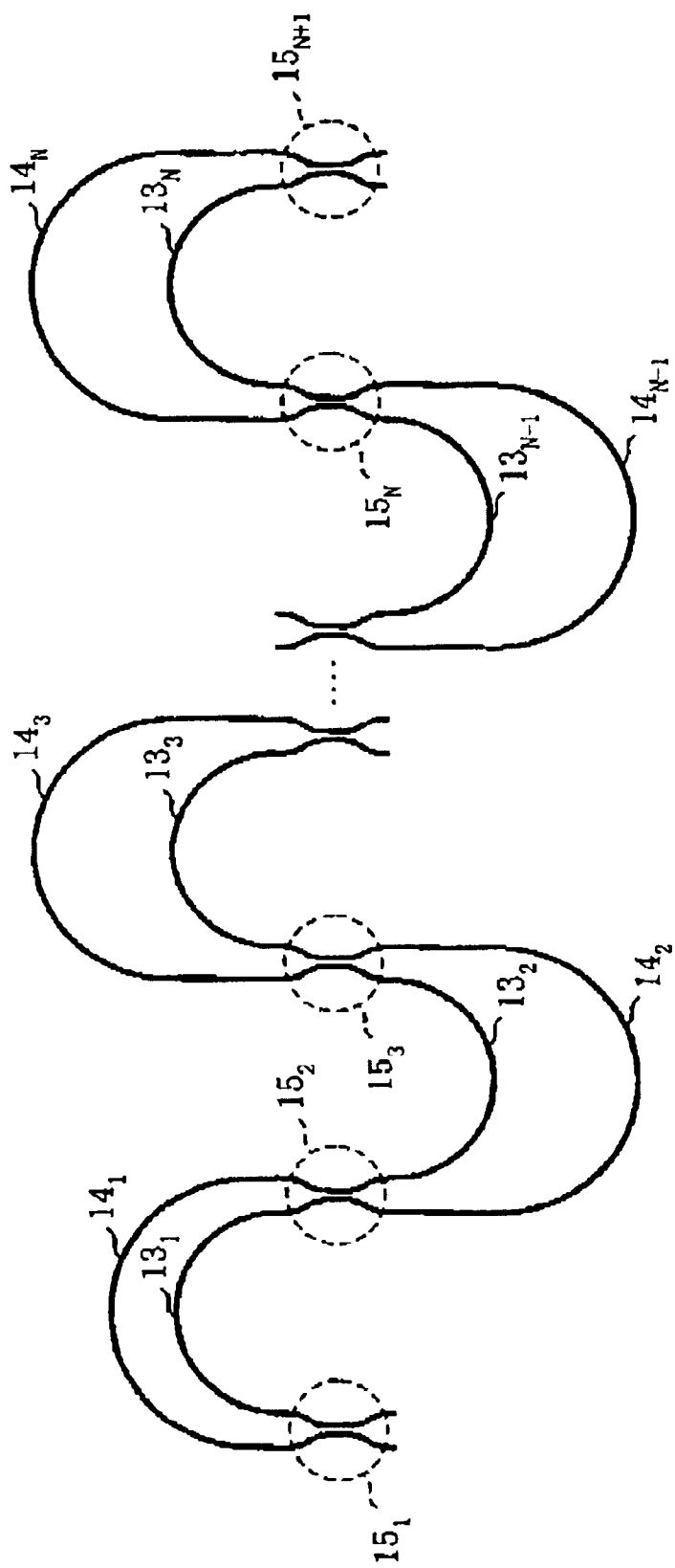
FIG. 3 is a plan view of a conventional optical device comprised of a plurality of Mach-Zehnder interferometer type optical circuits arranged in zigzag.

In the conventional optical devices illustrated in FIGS. 1 to 3, the input and output waveguides cannot have their ends at a common edge of a substrate. In general, the input and output waveguides have their ends at opposite ends of a substrate. Accordingly, optical fibers have to be optically connected to a substrate at opposite ends thereof in the conventional optical devices, resulting in a problem an increase in a size of a module.

In contrast, an optical fiber is optically connected to a substrate only at an edge thereof in the Mach-Zehnder interferometer optical circuit 111 in the first embodiment, ensuring reduction in a size of a module.

Though the input waveguide 124 and the output waveguide 122 are spaced away from each other by a relatively long distance $L_1$ in the Mach-Zehnder interferometer optical circuit 111, the distance $L_1$ can be shortened, in which case, it would be possible to input an optic signal into and output an optic signal from the Mach-Zehnder interferometer optical circuit 111 merely by optically connecting an optical fiber array including a plurality of optical fibers in parallel, to the substrate 112. This ensures further simplification in a structure of the optical device or optical modularized device.

Figure 5:
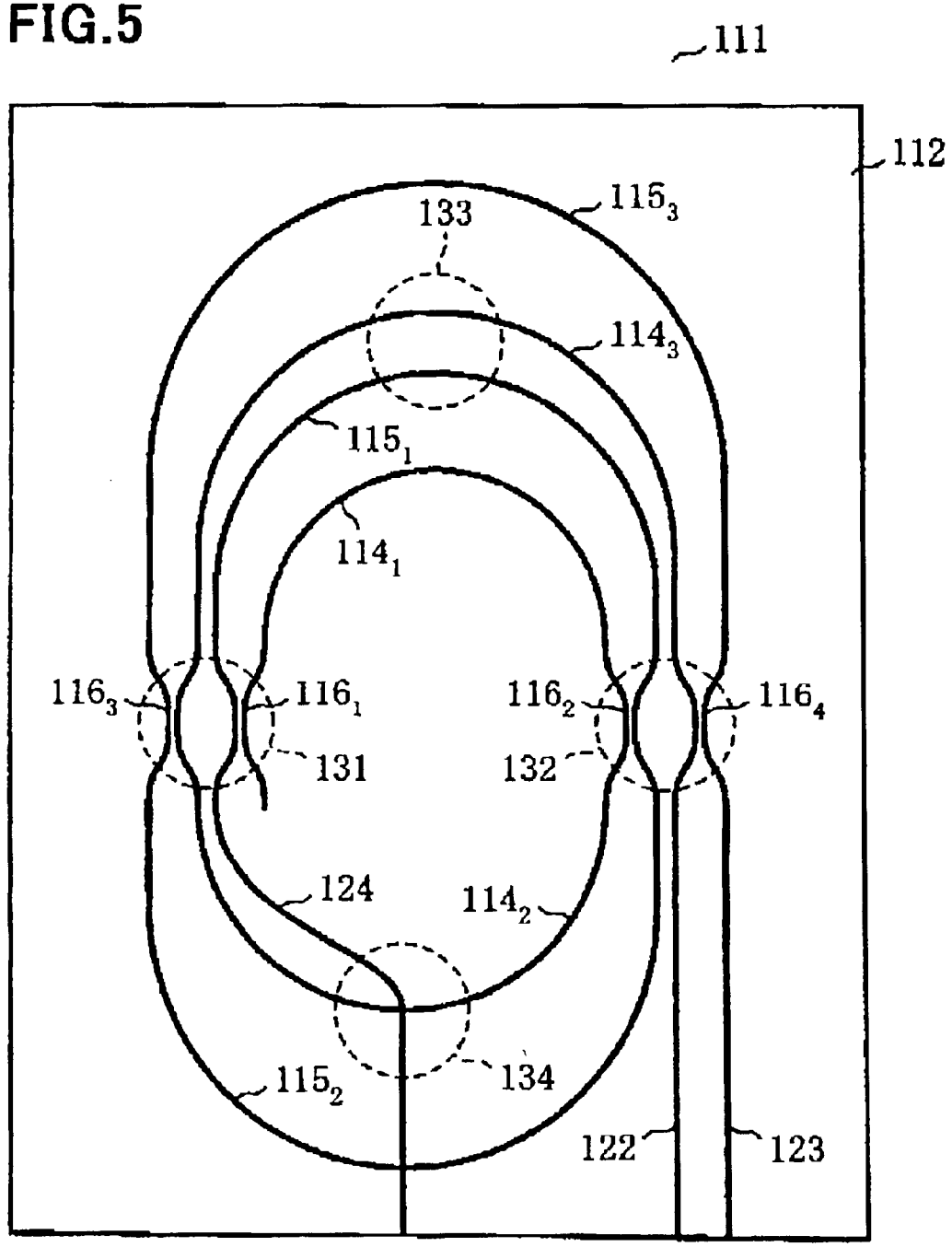
FIG. 5 is a plan view of an optical device in accordance with the first embodiment of the present invention, illustrating trimming regions.

FIG. 5 shows trimming regions to be defined when the Mach-Zehnder interferometer optical circuit 111 in the first embodiment is fabricated.

Herein, trimming means a process for compensating for a slight difference between designed and actual characteristics of an optical device which difference is generated when a waveguide pattern is formed on the substrate 112. In general, such difference is eternally or temporarily compensated for, for instance, by applying heat to a part of a waveguide through laser beams or varying optically inductive index of refraction.

In the Mach-Zehnder interferometer optical circuit 111 in the first embodiment, as mentioned earlier, the first directional coupler $116_1$ and the third directional coupler $116_3$ are arranged close to each other. Accordingly, a region covering the first directional coupler $116_1$ and the third directional coupler $116_3$ therewith can be defined as a trimming region 131. By applying laser beams to the trimming region 131, for instance, characteristics of the first directional coupler $116_1$ and the third directional coupler $116_3$ can be concurrently and properly compensated for. This is based on that it is considered that directional couplers located close to each other on the substrate 112 have similar deviation from designed characteristics, and hence, it would be possible to compensate for the directional couplers in a common trimming region.

Even if the first directional coupler $116_1$ and the third directional coupler $116_3$ are required to be compensated for by trimming in different ways, trimming to be carried out for the first directional coupler $116_1$ and the third directional coupler $116_3$ in common may be concurrently carried out, which ensures simplification in compensating for characteristics of directional couplers by trimming.

In the Mach-Zehnder interferometer optical circuit 111 in the first embodiment, as mentioned earlier, the second directional coupler $116_2$ and the fourth directional coupler $116_4$ are also arranged close to each other. Accordingly, a region covering the second directional coupler $116_2$ and the fourth directional coupler $116_4$ therewith can be defined as a trimming region 132.

Similarly, a region covering the longer arm $151_1$ of the first asymmetric Mach-Zehnder interferometer type optical circuit $113_1$ and the shorter arm $114_3$ of the third asymmetric Mach-Zehnder interferometer type optical circuit $113_3$ located adjacent to the longer arm $115_1$ may be defined as a trimming region 133, and a region in which the shorter arm $114_2$ of the second asymmetric Mach-Zehnder interferometer type optical circuit $113_2$ intersects with the input waveguide 124 may be defined as a trimming region 134.

Figure 6:
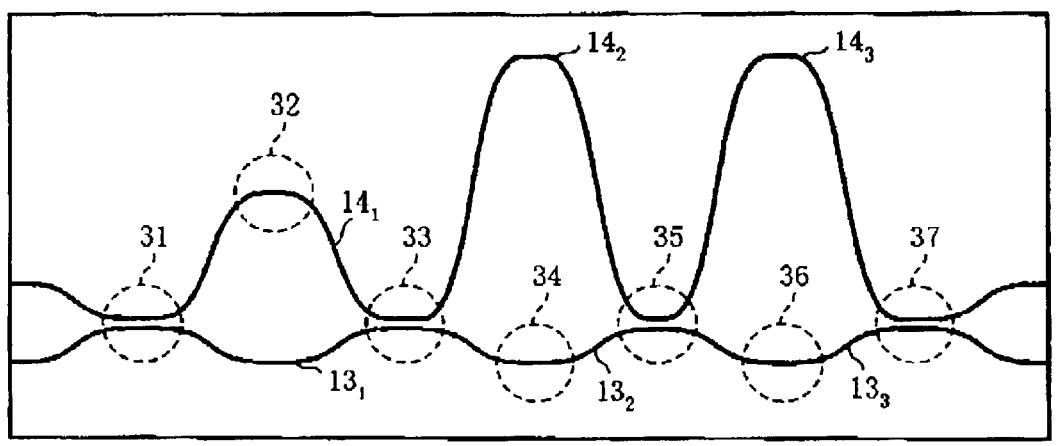
FIG. 6 is a plan view of trimming regions in a conventional optical device having three-staged optical circuits similarly to the first embodiment.

FIG. 6 shows trimming regions to be defined in a conventional optical device including three optical circuits similarly to the first embodiment.

If it is assumed that a conventional optical device is required to be trimmed at four regions corresponding to the four trimming regions 131 to 134 illustrated in FIG. 5, the conventional optical device has to have seven trimming regions 31 to 37, as illustrated in FIG. 6. Accordingly, laser beams have to be irradiated to the conventional optical device seven times, specifically, to the trimming regions 31 to 37 in order.

In contrast, laser beams are irradiated four times to the optical device in accordance with the first embodiment. Thus, the optical device in accordance with the first embodiment makes it possible to reduce the number of fabrication steps in comparison with a conventional optical device.

Figure 7:
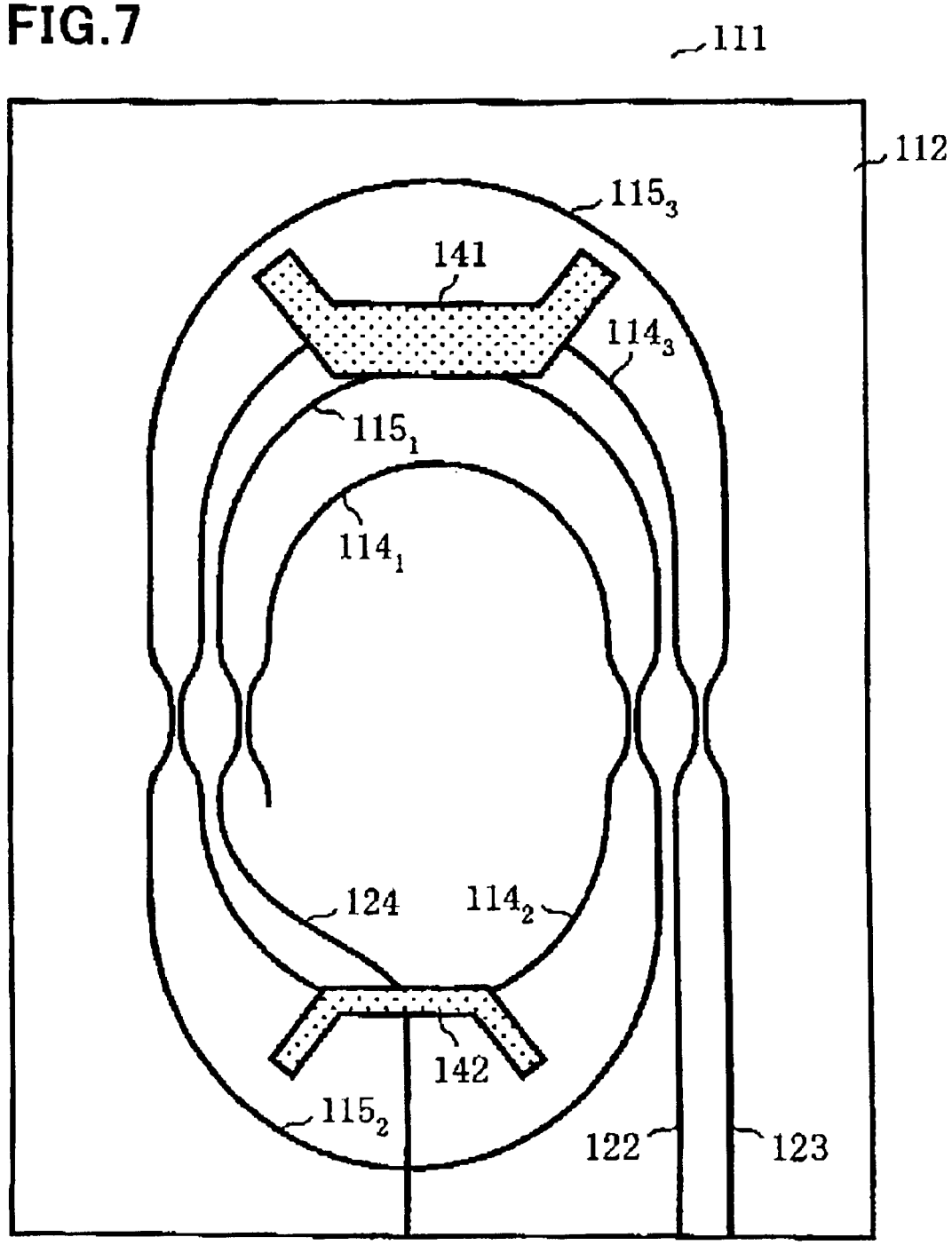
FIG. 7 is a plan view of an optical device including heater electrodes.

FIG. 7 illustrates the optical device in accordance with the first embodiment which is to be compensated for by means of heater electrodes in place of carrying out trimming in the above-mentioned way.

The above-mentioned trimming compensates for characteristics of the optical device eternally or temporarily. Instead, characteristics of the optical device may be compensated for by arranging heater electrodes in predetermined regions in the substrate 112.

The optical device illustrated in FIG. 7 is designed to include first and second heater electrodes 141 and 142 in regions corresponding to the trimming regions 133 and 134. When the Mach-Zehnder interferometer optical circuit 111 is operated, a current for compensation is applied to the heater electrodes 141 and 142, and resultingly, characteristics of the longer arm $115_1$ and the shorter arm $114_3$ and characteristics of the input waveguide 124 and the shorter arm $114_2$ can be compensated for in common.

Figure 8:
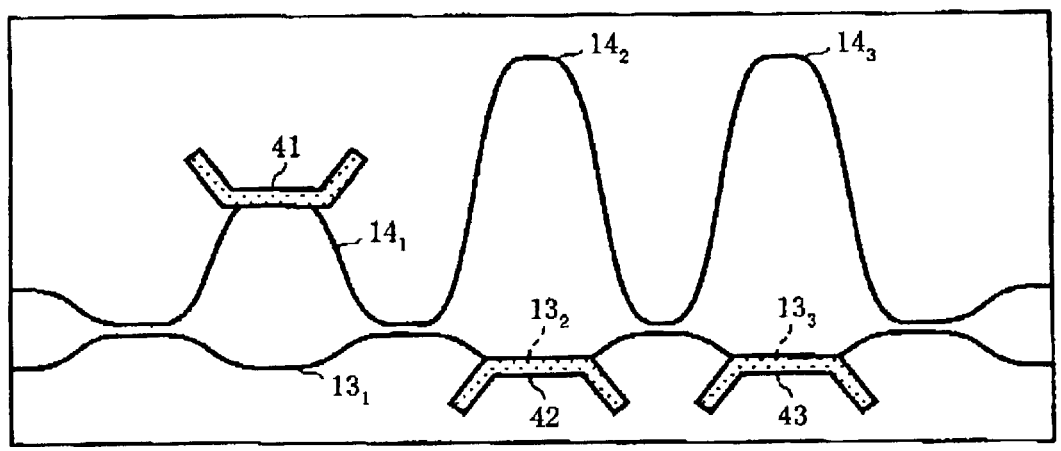
FIG. 8 is a plan view of a conventional optical device including heater electrodes similarly to the optical device illustrated in FIG. 7.

FIG. 8 illustrates a conventional optical device to which heater electrodes are applied, similarly to the optical device illustrated in FIG. 7.

The conventional optical device illustrated in FIG. 8 needs to include three electrode heaters 41, 42 and 43. Accordingly, the optical device illustrated in FIG. 7 can be designed to include the heater electrodes in the smaller number than the conventional optical device illustrated in FIG. 8, ensuring reduction in volume of gold of which heater electrodes are composed.

The optical device in accordance with the first embodiment, comprised of the Mach-Zehnder interferometer optical circuit 111, provides the following advantages in comparison with the conventional optical devices illustrated in FIGS. 1 to 3.

(A) The optical device in accordance with the first embodiment reduces vacant regions other than optical circuits in comparison with the conventional optical devices illustrated in FIGS. 1 to 3, even if the optical device in accordance with the first embodiment includes Mach-Zehnder interferometers in an increased number. Hence, in comparison with the conventional optical devices, it is possible to prevent an increase in a size of the optical device, increase a yield at which optical circuits can be diced out of a substrate, and reduce fabrication costs of the optical device.

(B) A Mach-Zehnder interferometer type optical circuit is generally accompanied with a problem that it operates in a manner deviated from designed manner due to slight deviation in structural parameters such as a thickness of a waveguide, a width or a specific index of refraction. In order to correct such deviation, a laser beam is applied to the optical device to vary an optically inductive index of refraction or heat is applied locally to the optical device.

The above-mentioned deviation in structural parameters is kept fixed in a slight region in a substrate. Accordingly, correction for compensating for deviation of a waveguide from designed specification can be considered almost identical to one another in the slight region. As mentioned earlier, by arranging a plurality of optical circuits in a spiral, it would be possible to locate waveguides to be compensated for close to each other. Accordingly, it is possible to concurrently compensate for a plurality of waveguides located close to one another, through laser beams, ensuring reduction in time necessary for carrying out trimming.

(C) In order to dynamically control characteristics of an optical circuit, an index of refraction may be varied by virtue of thermo-optic (TO) effects, in place of applying laser beams to a waveguide for compensating for characteristics of the waveguide. To this end, a heater electrode or heater electrodes is(are) arranged on a waveguide in order to heat the waveguide. By arranging a plurality of optical circuits in a spiral, it would be possible to reduce the number of heater electrodes in comparison with the conventional optical device illustrated in FIGS. 1 to 3. Reduction in the number of heater electrodes ensures reduction in electric power consumption and the number of control circuits used for controlling heater electrodes.

(D) By arranging a plurality of optical circuits in a spiral as in the first embodiment, it would be possible to design an input waveguide optically connected to a first-stage optical circuit and an output waveguide optically connected to a final-stage optical circuit to have ends at an edge of a substrate, in dependence on an angle of circumference of a spiral defined by optical circuits. In such a conventional optical device as illustrated in FIGS. 1 to 3, input and output waveguides have their ends at opposite ends of a substrate, and hence, if an optical fiber is optically connected to the optical device, it would take much space. In contrast, since an optical fiber can be optically connected to the optical device only at an edge of a substrate, a space necessary for connection of an optical fiber to the optical device can be reduced, ensuring reduction in a size of a unit including the optical device.

It is preferable that the input waveguide 124 is designed to intersect with the shorter arm $114_2$ or the longer arm $115_2$ of the second asymmetric Mach-Zehnder interferometer type optical circuit $113_2$ at an angle of 90 degrees or almost 90 degrees. If the input waveguide 124 intersects with the shorter arm $114_2$ or the longer arm $115_2$ at an angle much greater or smaller than 90 degrees, optical loss would be generated, and/or an optic signal marching on through one of the waveguides would leak into the other waveguide at a high rate.

As explained above, in the Mach-Zehnder interferometer type optical circuit 111 in accordance with the first embodiment, the input waveguide 124 and the output waveguides 122 and 123 can be designed to have ends at the edge 121 of the substrate 112. This provides a big advantage in designing an optical device. It is assumed herein that the optical device in accordance with the first embodiment is optically connected to another optical device (not illustrated) for modularization.

In the conventional optical devices illustrated in FIGS. 1 to 3, the input and output waveguides cannot have their ends at a common edge of a substrate. In general, the input and output waveguides have their ends at opposite ends of a substrate. Accordingly, optical fibers have to be optically connected to a substrate at opposite ends thereof in the conventional optical devices, resulting in a problem an increase in a size of a module. In contrast, an optical fiber is optically connected to a substrate only at an edge thereof in the Mach-Zehnder interferometer optical circuit 111 in the first embodiment, ensuring reduction in a size of a module.

It should be noted that "input waveguide" and "output waveguide" may be replaced with "output waveguide" and "input waveguide", respectively, in the optical device in accordance with the first embodiment.

[Second Embodiment]

Figure 9:
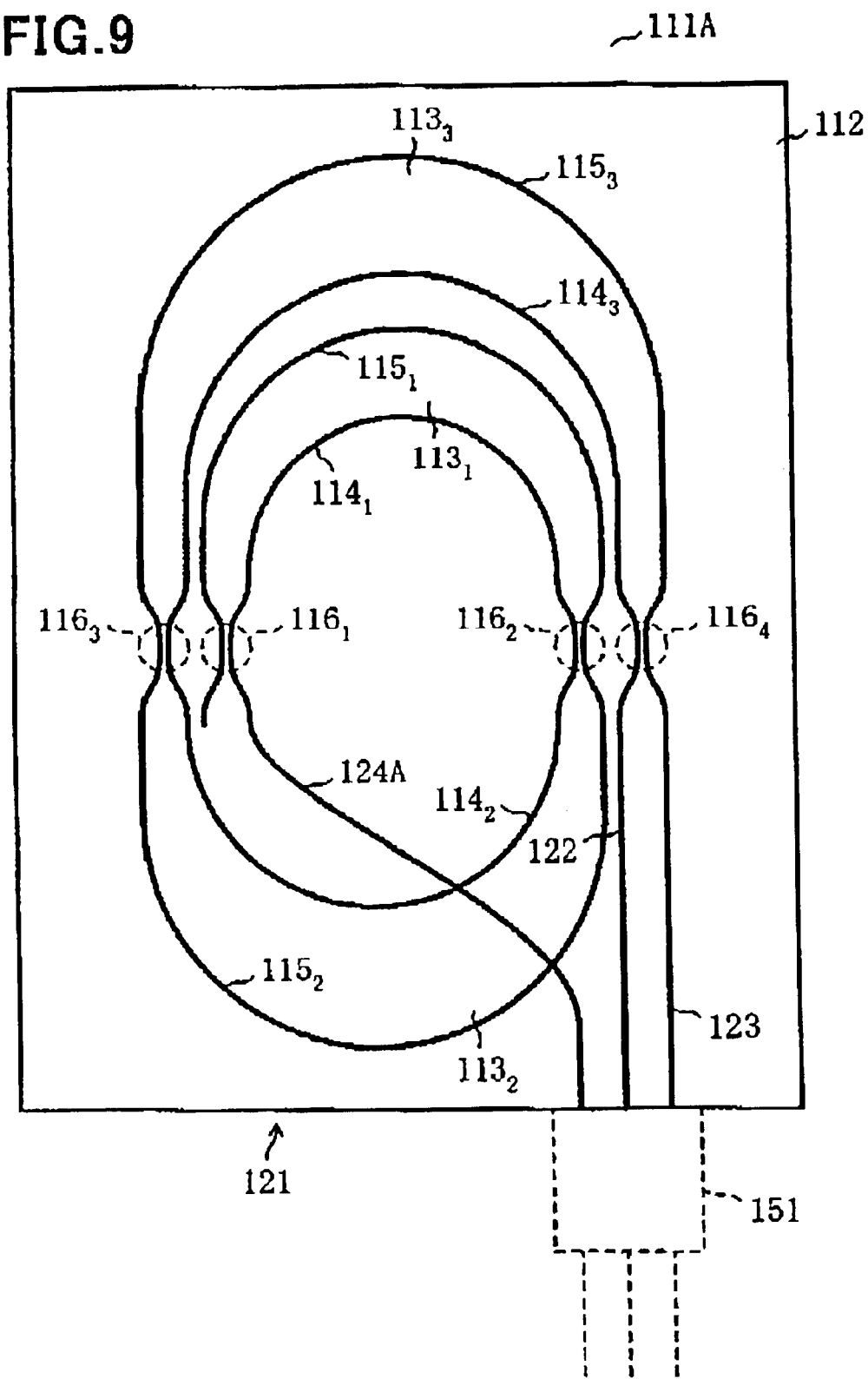
FIG. 9 is a plan view of an optical device in accordance with the second embodiment of the present invention.

FIG. 9 is a plan view of an optical device 111A in accordance with the second embodiment of the present invention. Parts or elements that correspond to those of the optical device in accordance with the first embodiment have been provided with the same reference numerals, and operate in the same manner as corresponding parts or elements in the first embodiment, unless explicitly explained hereinbelow.

The optical device 111A in accordance with the second embodiment is structurally different from the optical device 111 in accordance with the first embodiment in that an input waveguide 124A is optically connected to a shorter arm $114_1$ of the first asymmetric Mach-Zehnder interferometer type optical circuit $113_1$.

The input waveguide 124A optically connects the first directional coupler $116_1$ to an optical fiber array 151 illustrated with a broken line, and intersects with the shorter arm $114_2$ and the longer arm $115_2$ of the second asymmetric Mach-Zehnder interferometer type optical circuit $113_2$ at an angle of approximate 90 degrees. This is for the purpose of preventing optical loss at an intersection of the input waveguide 124A with the shorter arm $114_2$ and the longer arm $115_2$, and further, of preventing an optic signal passing through the input waveguide 124A from leaking into the shorter arm $114_2$ and/or the longer arm $115_2$, and vice versa.

An end of the input waveguide 124A through which the input waveguide 124A is optically connected to the optical fiber array 151, an end of the output waveguide 122, and an end of the output waveguide 123 are arranged to be equally spaced away from one another at the edge 121 of the substrate 112. This arrangement of the ends of the input waveguide 124A and the output waveguides 122 and 123 provides an advantage over the Mach-Zehnder interferometer type optical circuit 111 in accordance with the first embodiment, as follows.

In the Mach-Zehnder interferometer type optical circuit 111, it was necessary to connect an optical fiber array through which an optical signal is input into the optical device and another optical fiber array through which an optical signal is output from the optical device to the substrate 112 in separation. In contrast, in the Mach-Zehnder interferometer type optical circuit 111A illustrated in FIG. 9, the optical fiber array 151 through which an optical signal is input into the optical device and an optical signal is output from the optical device is optically connected to the substrate 112, ensuring reduction in the number of optical fiber arrays.

[Third Embodiment]

Figure 10:
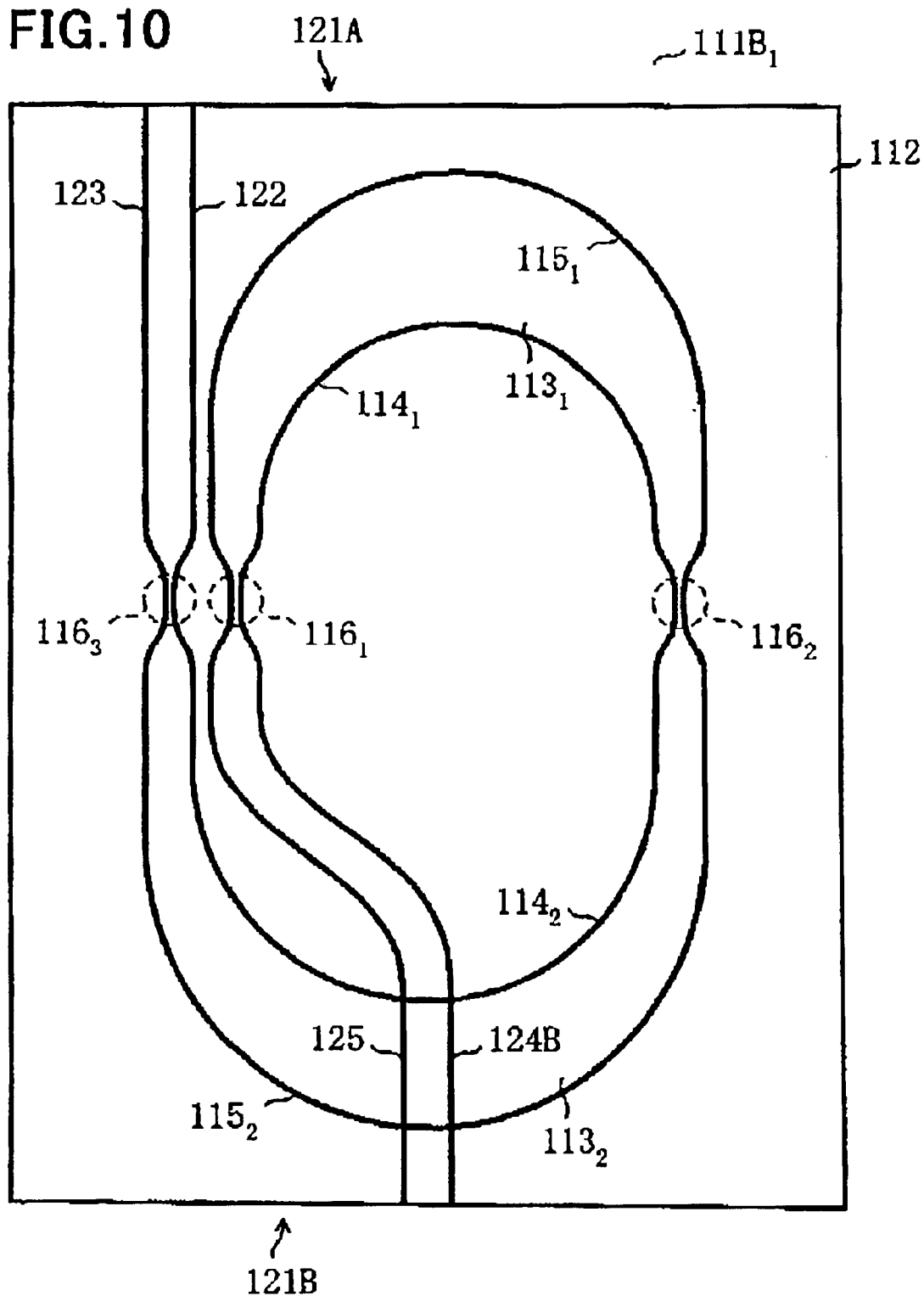
FIG. 10 is a plan view of an optical device in accordance with the third embodiment of the present invention.

FIG. 10 is a plan view of an optical device in accordance with the third embodiment of the present invention. Parts or elements that correspond to those of the optical device in accordance with the first embodiment have been provided with the same reference numerals, and operate in the same manner as corresponding parts or elements in the first embodiment, unless explicitly explained hereinbelow.

The optical device in accordance with the second embodiment includes a Mach-Zehnder interferometer type optical circuit $111B_1$ comprised of a substrate 112, first and second asymmetric Mach-Zehnder interferometer type optical circuit $113_1$ and $113_2$, and first to third directional couplers $116_1$, $116_2$ and $116_3$.

The first and second asymmetric Mach-Zehnder interferometer type optical circuit $113_1$ and $113_2$ are optically connected in series and arranged in a spiral.

The first asymmetric Mach-Zehnder interferometer type optical circuit $113_1$ located closest to a center of the spiral is designed to have a shorter arm $114_1$ and a longer arm $115_1$, and is optically connected to input waveguides 124B and 125 through the first directional coupler $116_1$ and further to the second asymmetric Mach-Zehnder interferometer type optical Circuit $113_2$ through the second directional coupler $116_2$.

The second asymmetric Mach-Zehnder interferometer type optical circuit $113_2$ is designed to have a shorter arm $114_2$ and a longer arm $115_2$, and is optically connected to an output of the first asymmetric Mach-Zehnder interferometer type optical circuit $113_1$ through the second directional coupler $116_2$ and further to output waveguides 122 and 123 through the third directional coupler $116_3$.

The shorter arms $114_1$ and $114_2$ are different in length from each other, and similarly, the longer arms $115_1$ and $115_2$ are different in length from each other. A difference in length between each of the shorter arms $114_1$ and $114_2$ and each of the longer arms $115_1$ and $115_2$ is determined to define desired characteristics of the first and second Mach-Zehnder interferometer type optical circuits $113_1$ and $113_2$.

As illustrated in FIG. 10, the first and third directional couplers $116_1$ and $116_3$ are located close to each other, and the second directional coupler $116_2$ is located at an opposite side of the substrate 112 from the first and third directional couplers $116_1$ and $116_3$. Since the first and third asymmetric Mach-Zehnder interferometer type optical circuit $113_1$ and $113_3$ are designed to define a half of the spiral, an input of the first directional coupler $116_1$ and an output of the third directional coupler $116_3$ are directed to opposite edges of the substrate 112. Accordingly, the output waveguides 122 and 123 optically connected to the output of the third directional coupler $116_3$ are arranged to have one ends at an edge 121A of the substrate 112, and input waveguides 124B and 125 optically connected to the inputs of the first directional coupler $116_1$ are arranged to have one ends at an edge 121B of the substrate 112.

Thus, the Mach-Zehnder interferometer type optical circuit $111B_1$ is structurally different from the Mach-Zehnder interferometer type optical circuit 111 illustrated in FIG. 4, as follows.

First, the Mach-Zehnder interferometer type optical circuit 111 accomplishes an optical device having one input and two outputs, whereas the Mach-Zehnder interferometer type optical circuit $111B_1$ accomplishes an optical device having two inputs and two outputs.

Second, the input waveguides 124B and 125 and the output waveguides 122 and 123 have ends at the opposite edges 121B and 121A of the substrate 112.

With respect to the above-mentioned second difference, by arranging the input waveguides 124B and 125 to direct towards the edge 121A, it would be possible to design the input waveguides 124B and 125 and the output waveguides 122 and 123 to have their ends at the common edge 121A of the substrate 112.

Figure 11:
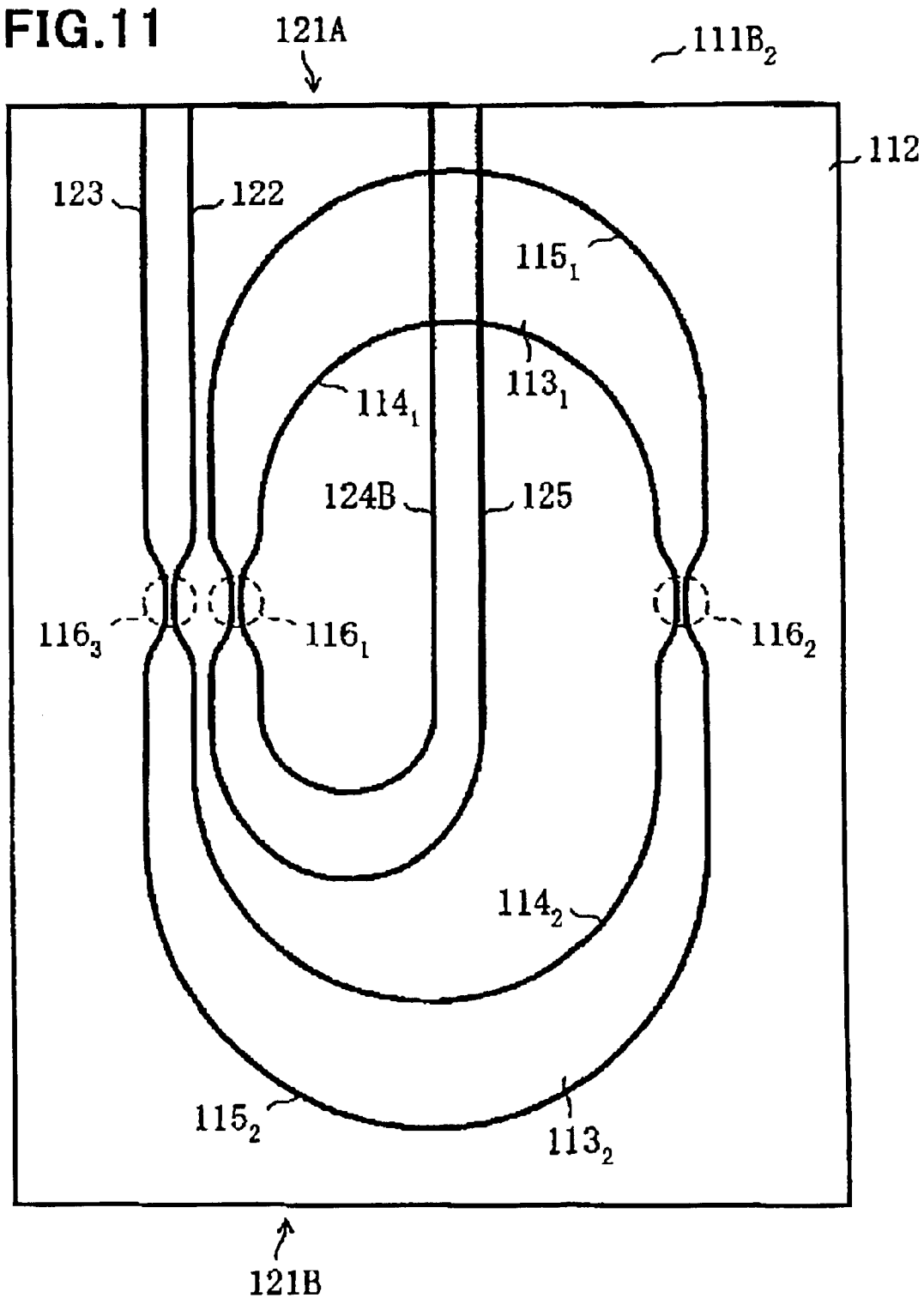
FIG. 11 is a plan view of a variant of an optical device in accordance with the third embodiment of the present invention.

FIG. 11 illustrates a Mach-Zehnder interferometer type optical circuit $111B_2$ as an example of an optical circuit in which the input and output waveguides have their ends at a common edge of the substrate 112.

[Fourth Embodiment]

In the optical devices in accordance with the above-mentioned first to third embodiments, the shorter arms 1141 to 1143 and the longer arms 1151 to 1153 are all comprised of a semicircle or a circular arc having a predetermined center. It is not always necessary that the shorter and longer arms are comprised of a semicircle or a circular arc.

Figure 12:
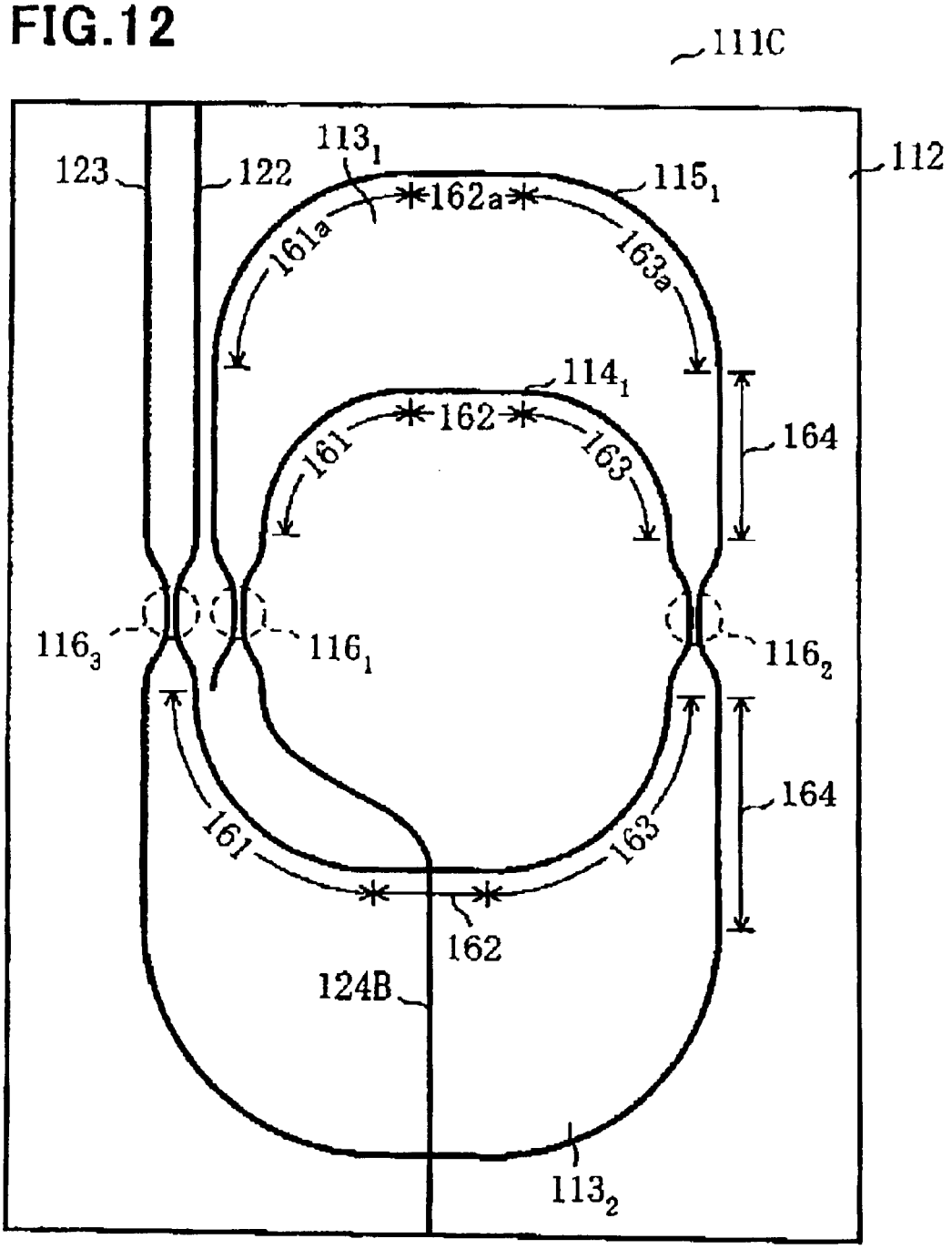
FIG. 12 is a plan view of an optical device in accordance with the fourth embodiment of the present invention.

FIG. 12 is a plan view of an optical device in accordance with the fourth embodiment of the present invention. Parts or elements that correspond to those of the optical device in accordance with the fourth embodiment have been provided with the same reference numerals, and operate in the same manner as corresponding parts or elements in the first embodiment, unless explicitly explained hereinbelow.

The optical device in accordance with the fourth embodiment includes a Mach-Zehnder interferometer type optical circuit 111C which is structurally different from the Mach-Zehnder interferometer type optical circuit $111B_1$ illustrated in FIG. 10 in that the Mach-Zehnder interferometer type optical circuit 111C includes no input waveguide corresponding to the input waveguide 125 illustrated in FIG. 10, and further, in that the shorter arms $114_1$ and $114_2$ and the longer arms $115_1$ and $115_2$ in the Mach-Zehnder interferometer type optical circuit 111C are different in shape from the shorter arms $114_1$ and $114_2$ and the longer arms $115_1$ and $115_2$ in the Mach-Zehnder interferometer type optical circuit $111B_1$.

Specifically, the shorter arm $114_1$ in the first asymmetric Mach-Zehnder interferometer type optical circuit $113_1$ is comprised of a first quarter circle 161, a linear portion 162 connected at one end to the first quarter circle 161, and a second quarter circle 163 connected at one end to the linear portion 162.

The linear portion 162 is used for trimming the optical circuit $113_1$. The first and second quarter circles 161 and 163 are symmetrically arranged about a center line of the substrate 112 extending in parallel with a longer side of the substrate 112.

Similarly, the longer arm $115_1$ in the first asymmetric Mach-Zehnder interferometer type optical circuit $113_1$ is comprised of a first quarter circle 161a, a linear portion 162a connected at one end to the first quarter circle 161a, a second quarter circle 163a connected at one end to the linear portion 162a, and a second linear portion 164 optically connected to the second quarter circle 163a.

Similarly, each of the shorter arm $114_2$ and the longer arm $115_2$ in the second asymmetric Mach-Zehnder interferometer type optical circuit $113_2$ is comprised of a first quarter circle, a linear portion, and a second quarter circle.

The longer arm $115_1$ is designed to have the second linear portion 164 optically connected to the second quarter circle 163a, in order to ensure a difference in length of an optical path between the longer arm $115_1$ and the shorter arm $114_1$. Similarly, the longer arm $115_2$ is designed to have a second linear portion optically connected to the second quarter circle, in order to ensure a difference in length of an optical path between the longer arm $115_2$ and the shorter arm $114_2$.

The second linear portion 164 may be optically connected to the first quarter circle 161a in place of the second quarter circle 163a.

The reason why the longer and shorter arms include the linear portion 162 or 162a is that such a linear portion could ensure higher accuracy in length of the longer and shorter arms than a circular arc portion.

Hereinbelow, a yield is compared between the optical device comprised of the first to third asymmetric Mach Zehnder interferometer type optical circuits $113_1$, $113_2$ and $113_3$ optically connected to one another in series, and a conventional optical device. It is assumed hereinbelow that a waveguide in the asymmetric Mach-Zehnder interferometer type optical circuit has a minimum bend radius of 5 mm, and a difference ΔL in length of optical paths is about 2 mm in order to set free spectral range (SFR) of a Mach-Zehnder interferometer equal to 100 GHz.

Figure 13:
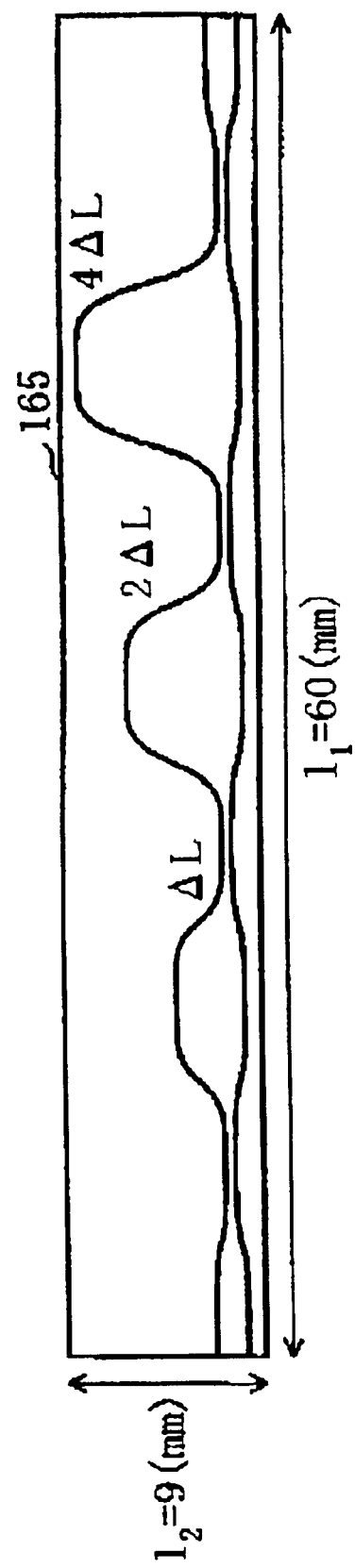
FIG. 13 illustrates a size of a conventional asymmetric Mach-Zehnder interferometer type optical circuit as a three-staged optical device.

FIG. 13 illustrates a conventional optical device 165 including three-staged asymmetric Mach-Zehnder interferometer type optical circuit circuits.

The conventional optical device 165 has a difference ΔL in length of optical paths in the first optical circuit, a difference 2ΔL in length of optical paths in the second optical circuit, and a difference 4ΔL in length of optical paths in the third optical circuit. The asymmetric Mach-Zehnder interferometer type optical circuit defining the conventional optical device 165 has a longer side having a length of about 60 mm and a shorter side having a length of about 9 mm.

Figure 14:
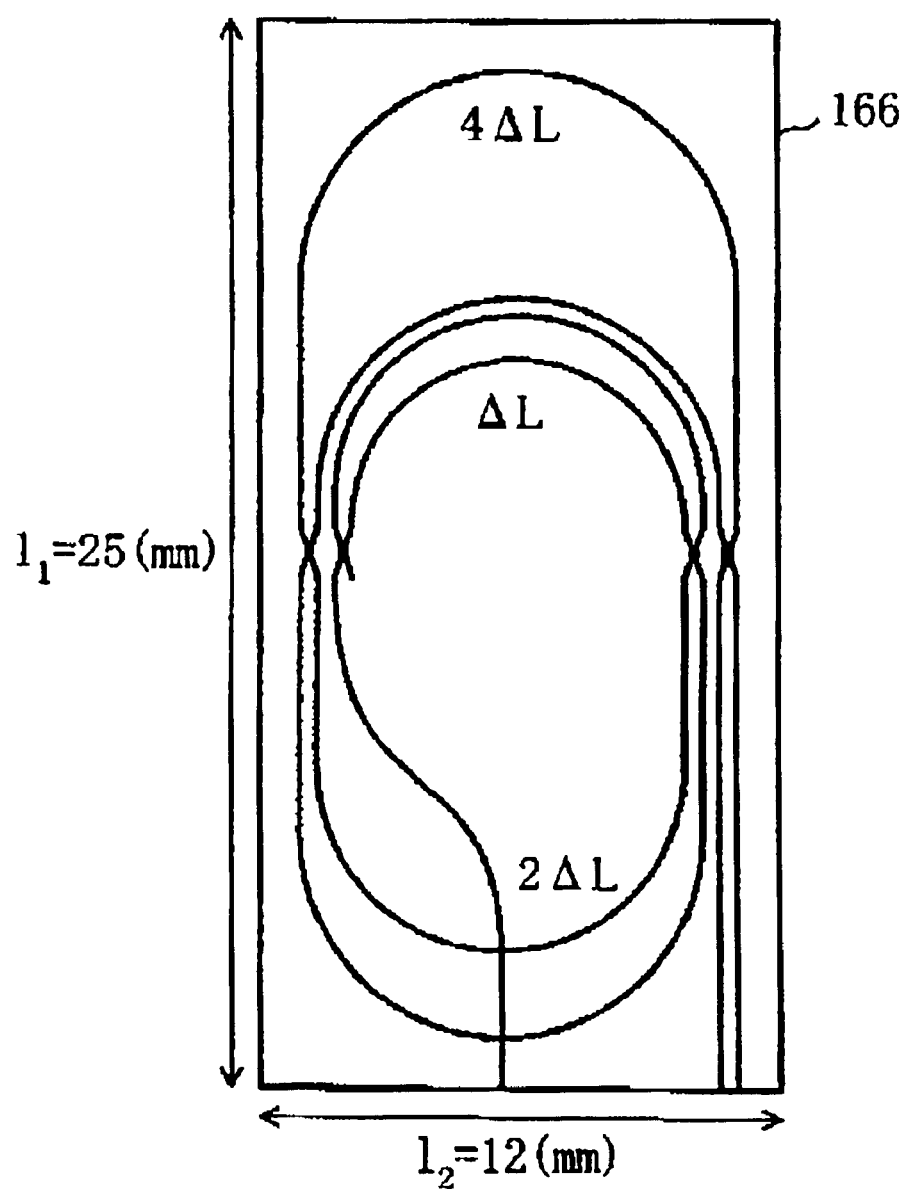
FIG. 14 illustrates a size of an asymmetric Mach-Zehnder interferometer type optical circuit as a three-staged optical device to which the present invention is applied.

FIG. 14 illustrates an optical device 166 including three asymmetric Mach-Zehnder interferometer type optical circuits, in accordance with the present invention.

The optical device 166 in accordance with the present invention has a difference ΔL in length of optical paths in the first optical circuit, a difference 2ΔL in length of optical paths in the second optical circuit, and a difference 4ΔL in length of optical paths in the third optical circuit. Applying the above-mentioned conditions to the optical device 166, the asymmetric Mach-Zehnder interferometer type optical circuit defining the optical device 166 would have a longer side having a length of about 25 mm and a shorter side having a length of about 12 mm.

Accordingly, twelve asymmetric Mach-Zehnder interferometer type optical circuits can be diced out of a 5-inch wafer for fabricating the conventional optical device 165 illustrated in FIG. 13. That is, a yield is twelve.

In contrast, thirty asymmetric Mach-Zehnder interferometer type optical circuits can be diced out of a 5-inch wafer for fabricating the optical device 166 illustrated in FIG. 14. That is, a yield is thirty which is 2.5 times greater than the yield at which the conventional optical device can be diced out of a wafer.

Figure 15:
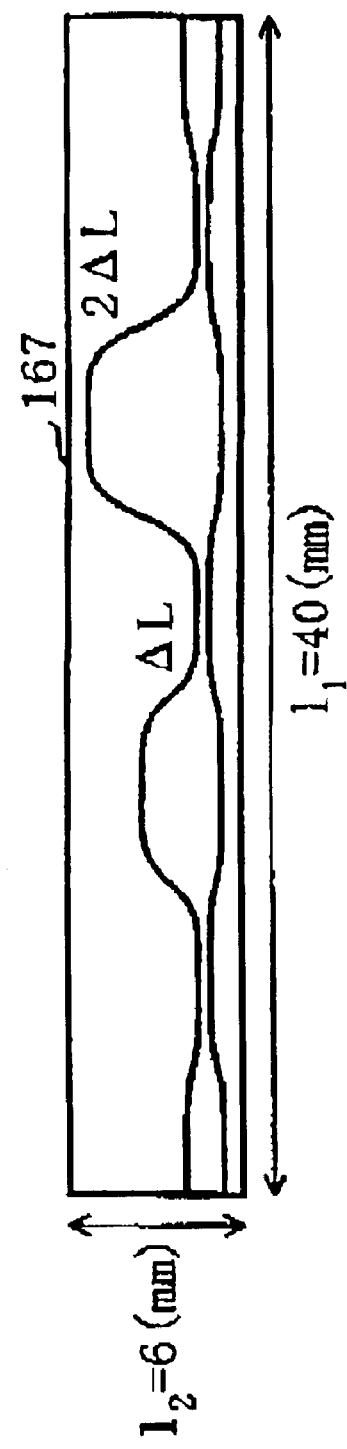
FIG. 15 illustrates a size of a conventional asymmetric Mach-Zehnder interferometer type optical circuit as a two-staged optical device.
Figure 16:
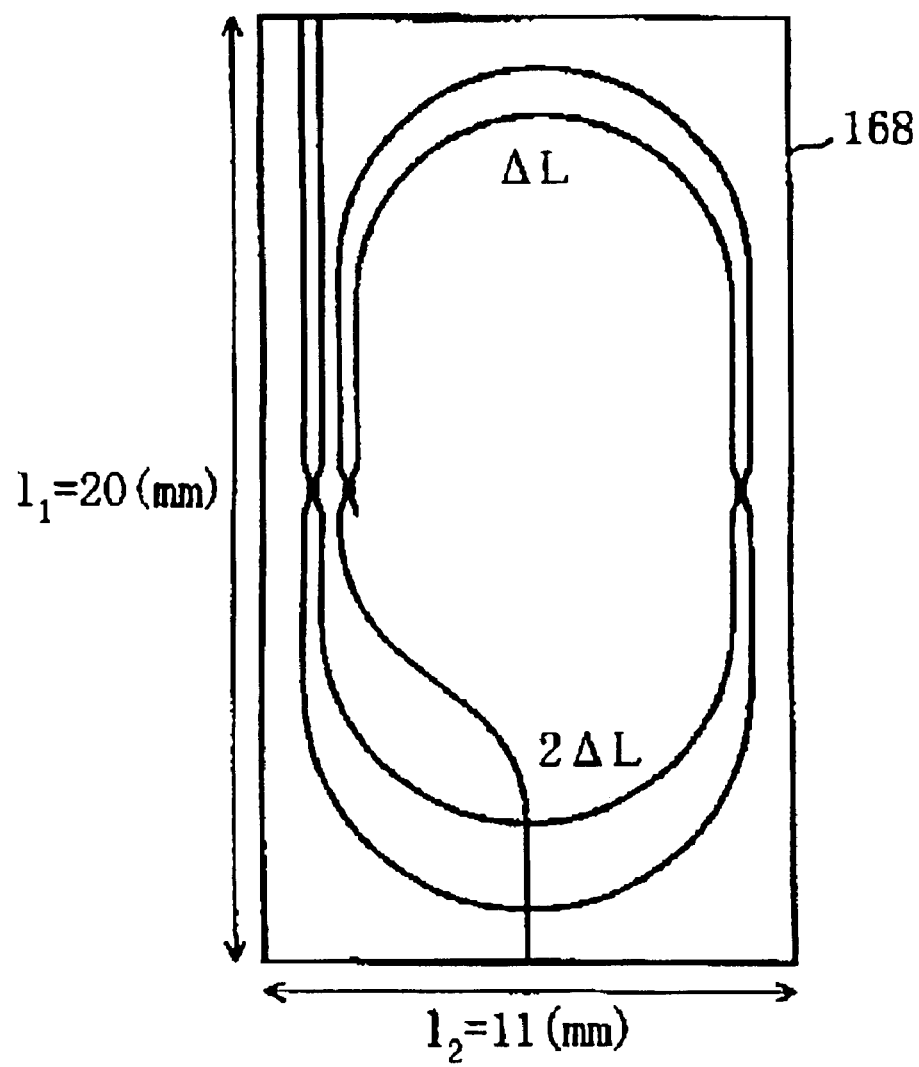
FIG. 16 illustrates a size of an asymmetric Mach-Zehnder interferometer type optical circuit as a two-staged optical device to which the present invention is applied.

FIG. 15 illustrates a conventional optical device 167 including two-staged asymmetric Mach-Zehnder interferometer type optical circuit circuits, and FIG. 16 illustrates an optical device 168 including two-staged asymmetric Mach-Zehnder interferometer type optical circuit circuits.

The conditions for designing the optical devices 167 and 168 are identical with the conditions for designing the optical devices 165 and 166 illustrated in FIGS. 13 and 14.

The asymmetric Mach-Zehnder interferometer type optical circuit defining the conventional optical device 167 would have a longer side having a length of about 40 mm and a shorter side having a length of about 6 mm. In contrast, the asymmetric Mach-Zehnder interferometer type optical circuit defining the optical device 168 would have a longer side having a length of about 20 mm and a shorter side having a length of about 11 mm.

Accordingly, thirty-two asymmetric Mach-Zehnder interferometer type optical circuits can be diced out of a 5-inch wafer for fabricating the conventional optical device 167 illustrated in FIG. 15. That is, a yield is thirty-two.

In contrast, forty-two asymmetric Mach-Zehnder interferometer type optical circuits can be diced out of a 5-inch wafer for fabricating the optical device 168 illustrated in FIG. 16. That is, a yield is forty-two which is about 1.3 times greater than the yield at which the conventional optical device 167 can be diced out of a wafer.

A difference in a yield between the conventional optical device and the optical device in accordance with the present invention would be greater, if the latter includes asymmetric Mach-Zehnder interferometer type optical circuits in the greater number.

In the above-mentioned first to fourth embodiments, the asymmetric Mach-Zehnder interferometer type optical circuit is designed to include the directional couplers. However, it should be noted that the asymmetric Mach-Zehnder interferometer type optical circuit may be designed to include MMI couplers.

[Fifth Embodiment]

Figure 17:
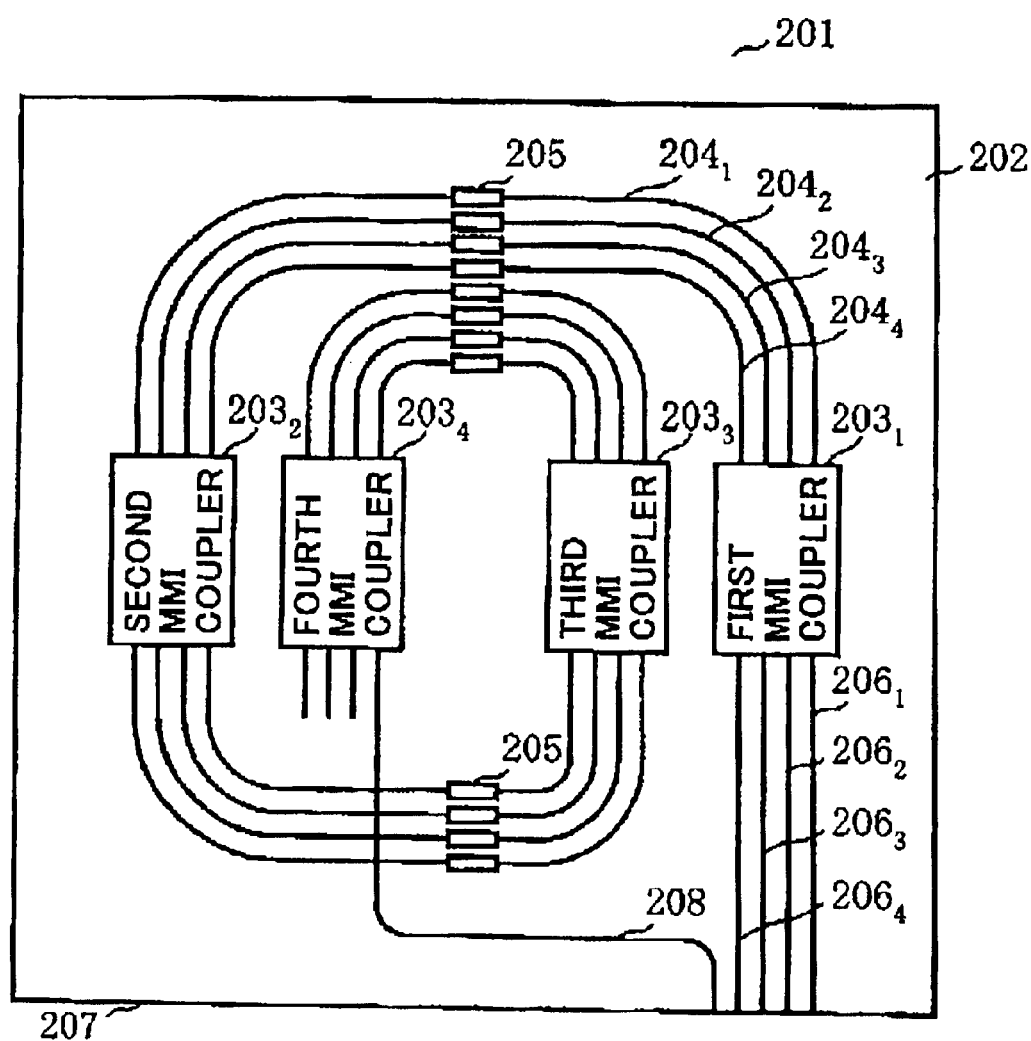
FIG. 17 is a plan view of an optical device in accordance with the fifth embodiment of the present invention, wherein the optical device is constructed as an optic FIR filter.

FIG. 17 is a plan view of an optical device in accordance with the fifth embodiment of the present invention. In the fifth embodiment, the optical device is constructed as an optic FIR filter.

The illustrated optic FIR filter 201 is comprised of a substrate 202, first to fourth MMI couplers $203_1$ to $203_4$, first to fourth waveguide arms $204_1$ to $204_4$ through which the first to fourth MMI couplers $203_1$ to $203_4$ are optically connected to one another in cascade and which are arranged in a spiral, and a plurality of phase-shifters 205 arranged in each of the first to fourth waveguide arms $204_1$ to $204_4$ for adjusting a phase.

First to fourth input waveguides $206_1$ to $206_4$ are optically connected at their one ends to the first MMI coupler $203_1$, and have other ends equally spaced away from one another at an edge 207 of the substrate 202. An output waveguide 208 is optically connected at one end thereof to one of four outputs of fourth MMI coupler $203_4$, and has the other end at the edge 207 of the substrate 202. The ends of the first to fourth input waveguides $206_1$ to $206_4$ and the output waveguide 208 are equally spaced away from one another at the edge 207 of the substrate 202.

The optic FIR filter 201 can accomplish various optical filters by adjusting phase-shifting degree by means of the phase-shifters 205. In the optic FIR filter 201 illustrated in FIG. 17, optic signals having different frequencies from one another are input into the optic FIR filter 201 through the first to fourth input waveguides $206_1$ to $206_4$, and resultingly, optic signals having multiplexed frequencies are output through the output waveguide 208.

Figure 18:
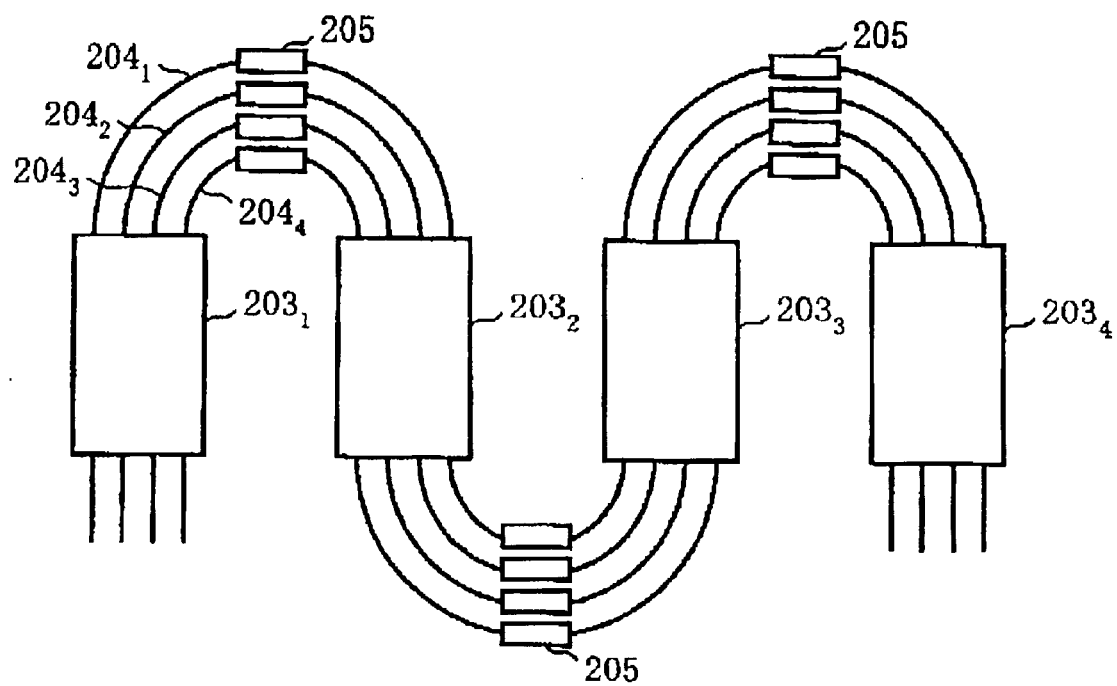
FIG. 18 is a plan view of an optical device equivalent to the optical device illustrated in FIG. 17.

FIG. 18 illustrates an optic FIR filter which is equivalent to the optic FIR filter 201 illustrated in FIG. 17, but has zigzag configuration.

The optic FIR filter illustrated in FIG. 18 has substantially the same structure as that of the optic FIR filter illustrated in FIG. 17 except that arms optically connecting the first to fourth MMI couplers $203_1$ to $203_4$ to one another are equal in length to one another in the optic FIR filter illustrated in FIG. 18, whereas arms optically connecting the first to fourth MMI couplers $203_1$ to $203_4$ to one another are not equal in length to one another in the optic FIR filter illustrated in FIG. 17.

[Sixth Embodiment]

Figure 19:
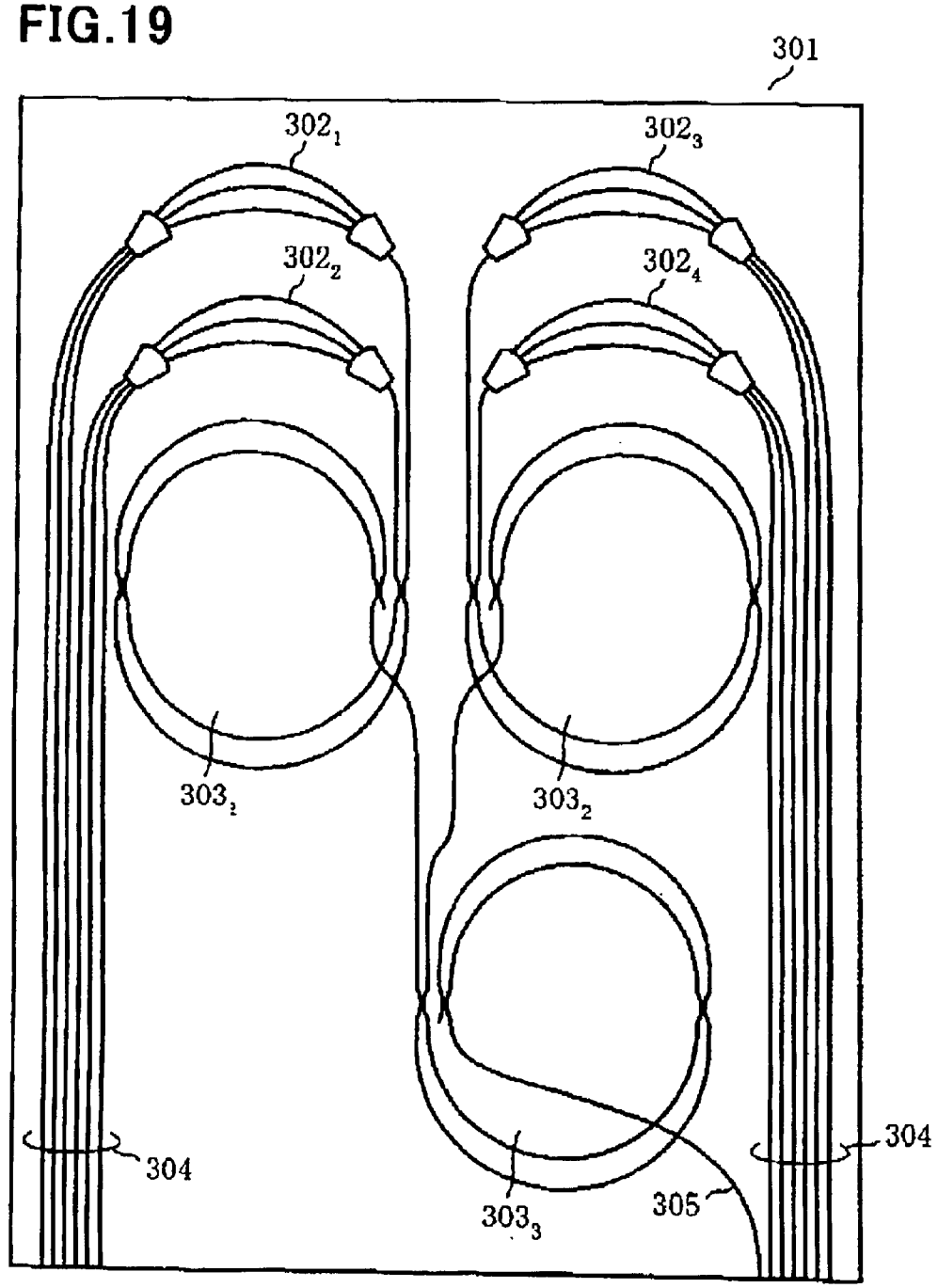
FIG. 19 is a plan view of an optical device in accordance with the sixth embodiment of the present invention.

FIG. 19 is a plan view of an optical device 301 in accordance with the sixth embodiment of the present invention.

The optical device 301 in accordance with the sixth embodiment is comprised of first to fourth arrayed waveguides (AWG) $302_1$ to $302_4$, and first to third units $303_1$ to $303_3$ each comprised of a plurality of Mach-Zehnder interferometer type optical circuits optically connected to one another such that each of the optical circuits is comb-shaped. Each of the first to third units $303_1$ to $303_3$ has a function of merging a plurality of wavelengths into one wavelength and separating a wavelength from merged wavelengths.

For instance, if optical signals are input into the optical device 301 through the first waveguide 304 at a pitch of 100 GHz, optical signals having a multiplexed wavelength is output through the second waveguide 305 at a pitch of 25 GHz. As an alternative, if optical signals having a multiplexed wavelength is input into the optical device 301 through the second waveguide 305 at a pitch of 25 GHz, optical signals are output through the first waveguide 304 at a pitch of 100 GHz.

In FIG. 19, the first waveguide 304 is illustrates with the reduced number of waveguides defining the first waveguides 304 for the purpose of simplification of the drawing. The first to third units $303_1$ to $303_3$ acts as a wavelength merger or a wavelength separator in dependence on a direction in which an optic signal is transmitted.

Figure 20:
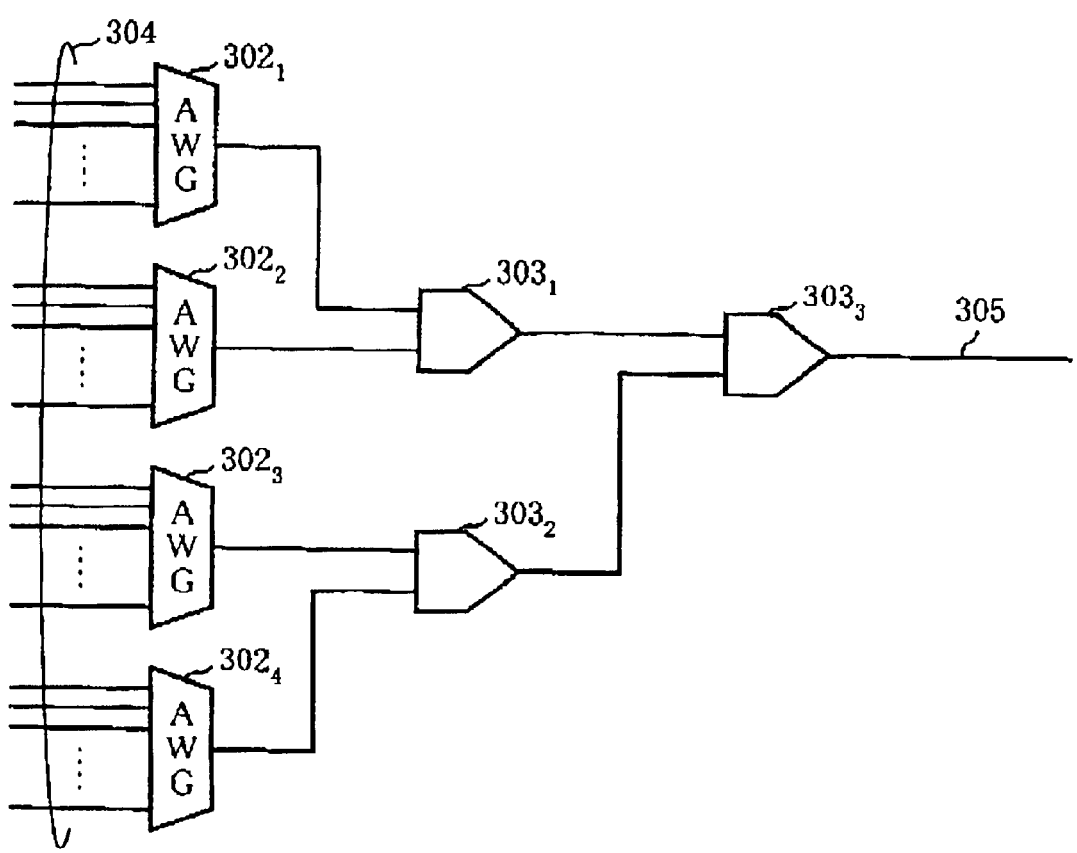
FIG. 20 is a block diagram of the optical device illustrated in FIG. 19.

FIG. 20 is a circuit diagram of the optical device illustrated in FIG. 19.

Optic signals are input into the first to fourth arrayed waveguides (AWG) $302_1$ to $302_4$ through the first waveguide 304 at a pitch of 100 GHz. An optic signal output from the first and second arrayed waveguides (AWG) $302_1$ and $302_2$, and having a multiplexed wavelength is input into the first unit $303_1$ is further multiplexed in the first unit $303_1$. As a result, an optic signal having a multiplexed wavelength is output from the first unit $303_1$ at a pitch of 50 GHz. Similarly, an optic signal output from the third and fourth arrayed waveguides (AWG) $302_3$ and $302_4$, and having a multiplexed wavelength is input into the second unit $303_2$ is further multiplexed in the second unit $303_2$. As a result, an optic signal having a multiplexed wavelength is output from the second unit $303_2$ at a pitch of 50 GHz.

The optic signals output from the first unit $303_1$ and the second unit $303_2$ are both input into the third unit $303_3$, and are further multiplexed in the third unit $303_3$. As a result, an optic signal having a multiplexed wavelength is output from the third unit $303_3$ at a pitch of 25 GHz.

It is possible to accomplish a unit for merging a plurality of wavelengths into one wavelength and separating a wavelength from merged wavelengths which unit has preferred cross-talk characteristics, by passing optical signals at a pitch of high frequencies through the first to third units $303_1$ to $303_3$ optically connected to one another. In addition, the first to fourth arrayed waveguides (AWG) $302_1$ to $302_4$ can be readily selected, and the optical device 301 can be fabricated at low costs by forming the optical device 301 as a single planar lightwave circuit (PLC).

[Seventh Embodiment]

Figure 21:
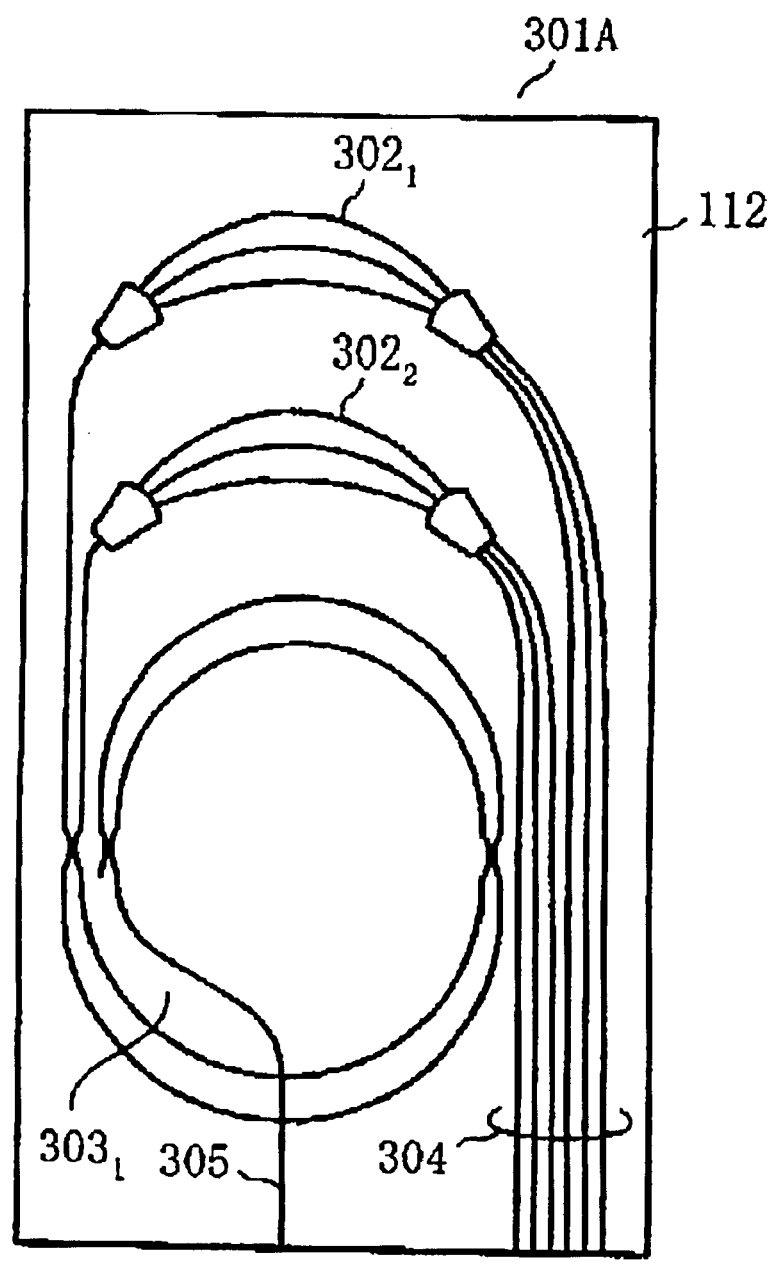
FIG. 21 is a plan view of an optical device in accordance with the seventh embodiment of the present invention.

FIG. 21 is a plan view of an optical device 301A in accordance with the seventh embodiment of the present invention.

The optical device 301A is comprised of first and second arrayed waveguides (AWG) $302_1$ and $302_2$, and a unit $303_1$ for merging a plurality of wavelengths into one wavelength and separating a wavelength from merged wavelengths. The unit $303_1$ is comb-shaped.

Figure 25:
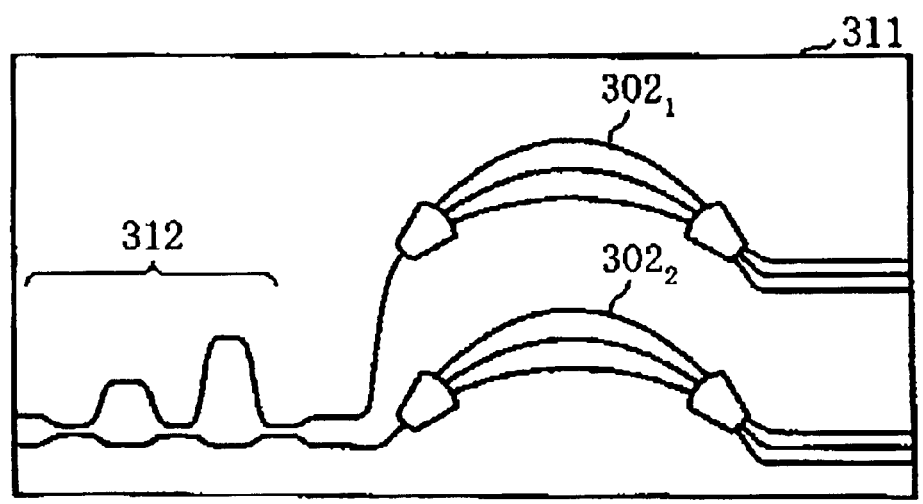
FIG. 25 is a plan view of a conventional optical device equivalent to the optical devices illustrated in FIGS. 21 and 23.

FIG. 25 illustrates a conventional optical device 311 equivalent to the optical device 301A illustrated in FIG. 21.

The conventional optical device 311 illustrated in FIG. 25 is comprised of a conventional optical device 312 including two asymmetric Mach-Zehnder interferometer type optical circuits, a first arrayed waveguide $302_1$ optically connected to the optical device 312, and a second arrayed waveguide $302_2$ optically connected to the optical device 312. Since the optical device 312 is horizontally lengthy, a ratio of a longer side to a shorter side in the optical device 311 is relatively high.

In the optical device 301A, the first and second arrayed waveguides $301_1$ and $302_2$ are curved in the same direction, and the unit $303_1$ comprised of the asymmetric Mach-Zehnder interferometer type optical circuits arranged in a spiral is positioned at a space generated because of the curvature of the first and second arrayed waveguides $301_1$ and $302_2$, resulting in reduction in a size of the optical device 301A.

Figure 22:
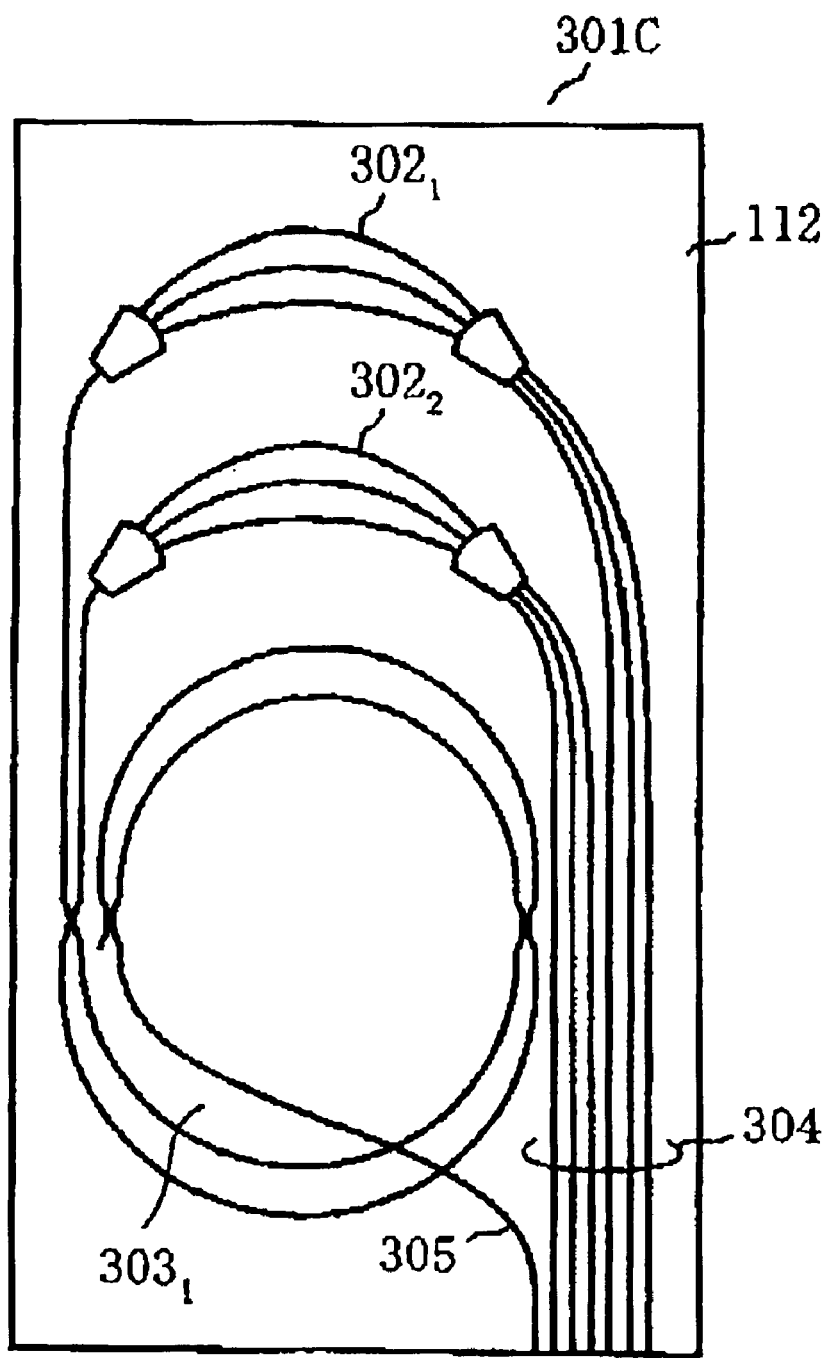
FIG. 22 is a plan view of a variant of an optical device in accordance with the seventh embodiment of the present invention.

FIG. 22 is a plan view of a variant of the optical device 301A illustrated in FIG. 21.

In the optical device 301A illustrated in FIG. 21, the first and second waveguides 304 and 305 have ends at a lower edge of the substrate 112. However, those ends are much spaced away from each other. Accordingly, two optical fiber arrays, that is, an optical fiber array through which optical signals are input into the optical device 301A and an optical fiber array through which optical signals output from the optical device 301A, have to be connected to the substrate 112.

The optical device 301C illustrated in FIG. 22 improves the above-mentioned matter. In the optical device 301C illustrated in FIG. 22, the first and second waveguides 304 and 305 are designed to have ends at a lower edge of the substrate 112 which ends are equally spaced away from each other. Accordingly, a single optical fiber array through which optical signals are input into the optical device 301C and optical signals output from the optical device 301C may be connected to the substrate 112 at the lower edge thereof. Thus, the optical device 301C reduces the number of optical fiber arrays to be connected to the substrate 112 in comparison with the optical device 301A illustrated in FIG. 21.

[Eighth Embodiment]

Figure 23:
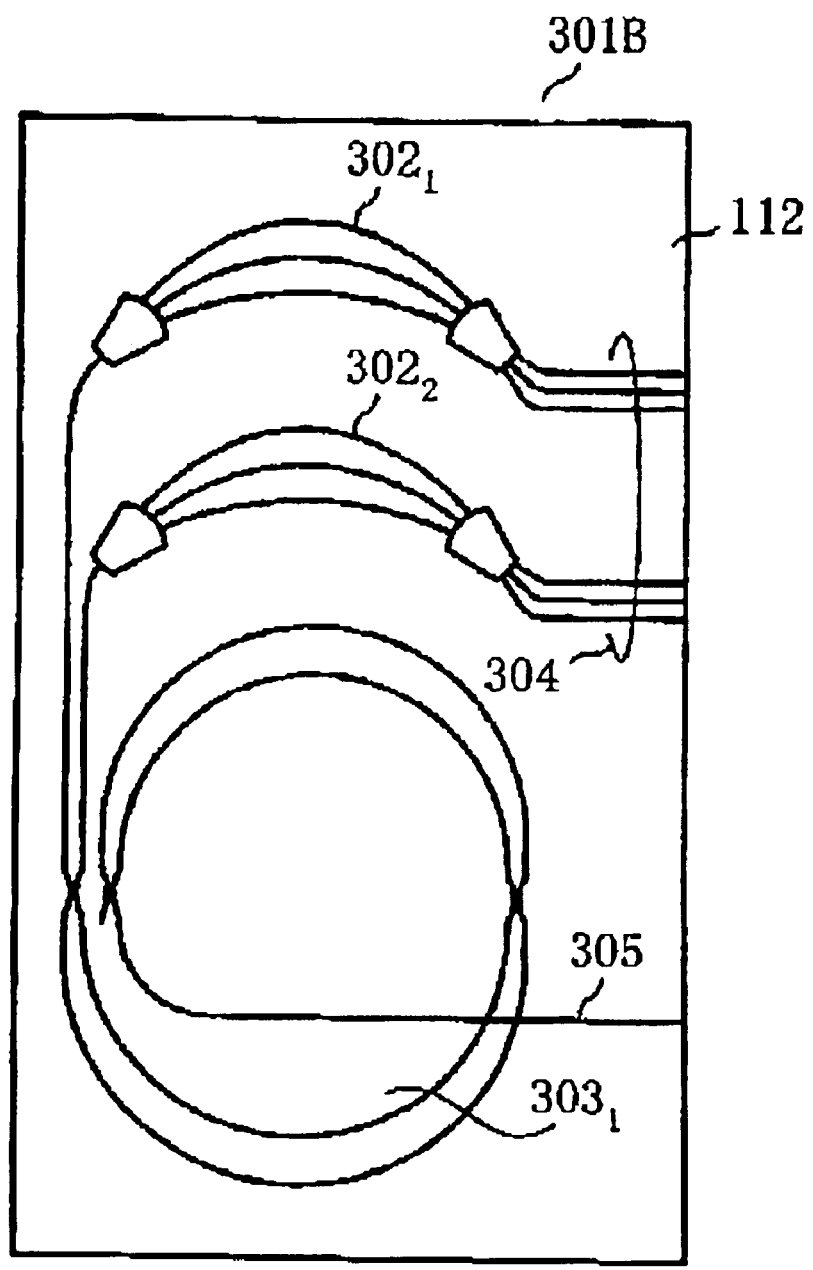
FIG. 23 is a plan view of an optical device in accordance with the eighth embodiment of the present invention.

FIG. 23 is a plan view of an optical device 301B in accordance with the eighth embodiment of the present invention.

The optical device 301B is comprised of first and second arrayed waveguides (AWG) $302_1$ and $302_2$, and a unit $303_1$ for merging a plurality of wavelengths into one wavelength and separating a wavelength from merged wavelengths. The unit $303_1$ is comb-shaped.

The optical device 301B is structurally different from the optical device 301A illustrated in FIG. 21 in that the waveguides 304 and 305 in the optical device 301B are designed to have their ends at a right edge of the substrate 112, whereas the waveguides 304 and 305 in the optical device 301A are designed to have their ends at a lower edge of the substrate 112.

FIG. 25 illustrates a conventional optical device 311 equivalent to the optical device 301B illustrated in FIG. 23.

The conventional optical device 311 illustrated in FIG. 25 is comprised of a conventional optical device 312 including two asymmetric Mach-Zehnder interferometer type optical circuits, a first arrayed waveguide $302_1$ optically connected to the optical device 312, and a second arrayed waveguide $302_2$ optically connected to the optical device 312. Since the optical device 312 is horizontally lengthy, a ratio of a longer side to a shorter side in the optical device 311 is relatively high.

In the optical device 301B, the first and second arrayed waveguides $301_1$ and $302_2$ are curved in the same direction, and the unit $303_1$ comprised of the asymmetric Mach-Zehnder interferometer type optical circuits arranged in a spiral is positioned at a space generated because of the curvature of the first and second arrayed waveguides $301_1$ and $302_2$, resulting in reduction in a size of the optical device 301B.

Figure 24:
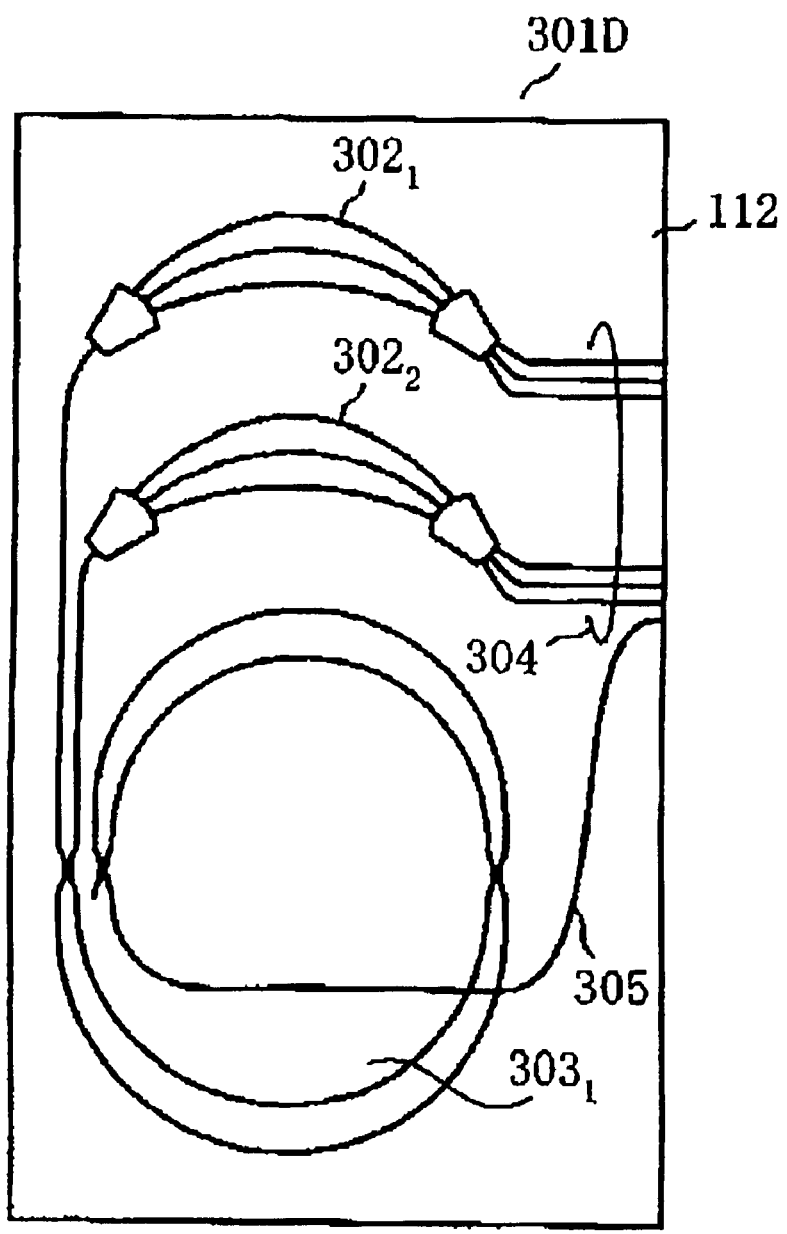
FIG. 24 is a plan view of a variant of an optical device in accordance with the eighth embodiment of the present invention.

FIG. 24 is a plan view of a variant of the optical device 301B illustrated in FIG. 23.

In the optical device 301B illustrated in FIG. 23, the first and second waveguides 304 and 305 have ends at a right edge of the substrate 112. However, those ends are much spaced away from each other. Accordingly, two optical fiber arrays, that is, an optical fiber array through which optical signals are input into the optical device 301B and an optical fiber array through which optical signals output from the optical device 301B, have to be connected to the substrate 112.

The optical device 301D illustrated in FIG. 24 improves the above-mentioned matter. In the optical device 301D illustrated in FIG. 24, the first and second waveguides 304 and 305 are designed to have ends at a right edge of the substrate 112 which ends are adjacent to each other. Accordingly, a single optical fiber array through which optical signals are input into the optical device 301D and optical signals output from the optical device 301D may be connected to the substrate 112 at the right edge thereof. Thus, the optical device 301D reduces the number of optical fiber arrays to be connected to the substrate 112 in comparison with the optical device 301B illustrated in FIG. 23.

[Ninth Embodiment]

Figure 26:
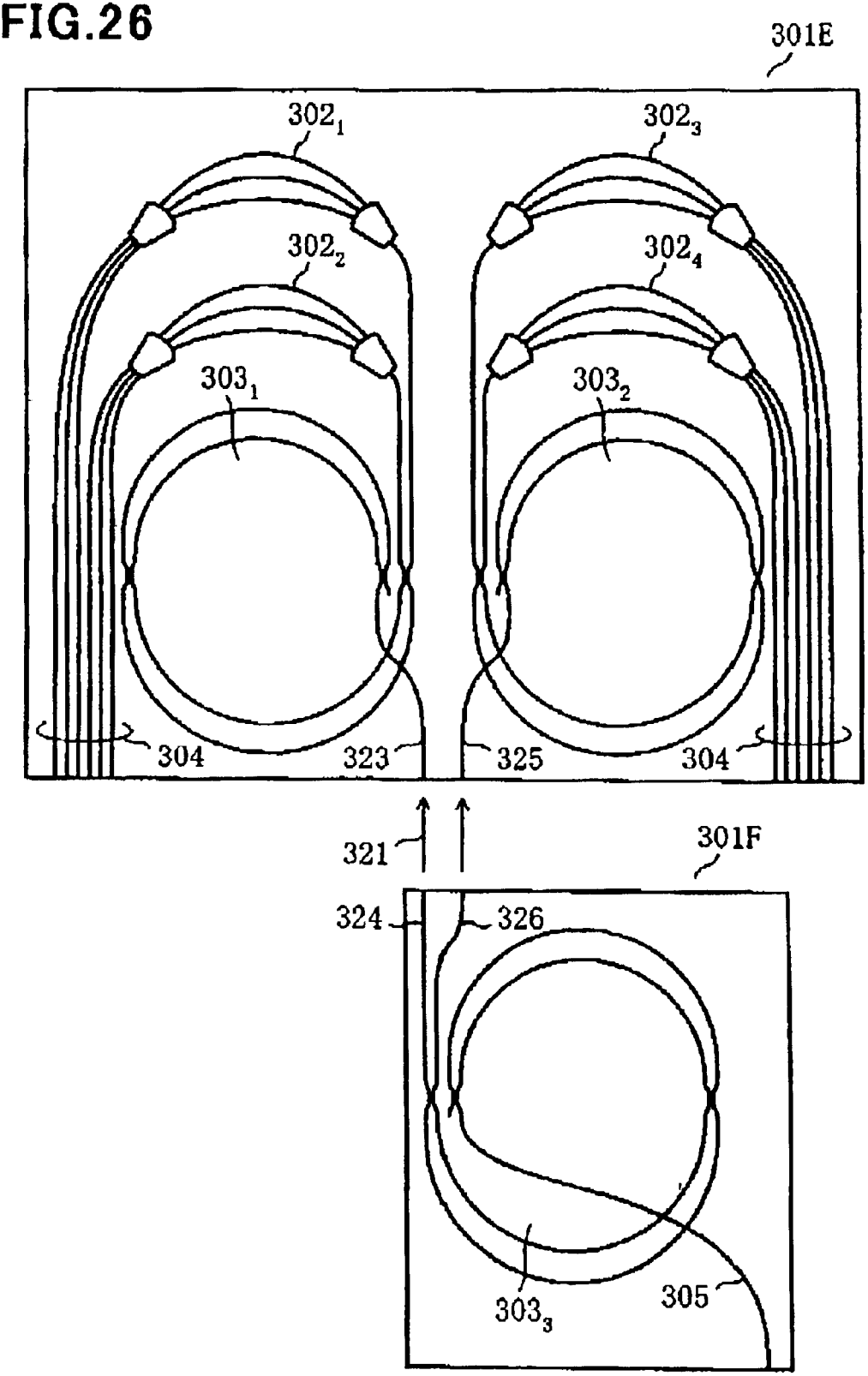
FIG. 26 is a plan view of an optical device in accordance with the ninth embodiment of the present invention.

FIG. 26 is a plan view of an optical device in accordance with the ninth embodiment of the present invention.

Parts or elements that correspond to those of the optical device 301 in accordance with the sixth embodiment, illustrated in FIG. 19, have been provided with the same reference numerals, and operate in the same manner as corresponding parts or elements in the sixth embodiment, unless explicitly explained hereinbelow.

In the ninth embodiment, the optical device 301 illustrated in FIG. 19 is divided into a first optical device 301E and a second optical device 301F. The first and second optical devices 301E and 301F are optically connected to each other as shown with arrows 321. A waveguide 323 extending from the first unit $303_1$ in the first optical device 301E and having an end at a lower edge of a substrate is positioned so as to be able to be optical connected to a waveguide 324 extending from the third unit $303_3$ in the second optical device 301F and having an end at an upper edge of a substrate. A waveguide 325 extending from the second unit $303_2$ in the first optical device 301E and having an end at a lower edge of a substrate is positioned so as to be able to be optically connected to a waveguide 326 extending from the third unit $303_3$ in the second optical device 301F and having an end at an upper edge of a substrate.

The waveguides 323 and 325 are designed to have ends spaced away from each other by a predetermined distance at a lower edge of the substrate. Similarly, the waveguides 324 and 326 are designed to have ends spaced away from each other by the above-mentioned predetermined distance at an upper edge of the substrate.

Thus, by physically and optically connecting the first and second optical devices 301E and 301F to each other, there is accomplished an optical device having the same function as the function of the optical device 301 illustrated in FIG. 19.

In addition, the relatively lengthy first waveguide 304 in the optical device 301 illustrated in FIG. 19 can be shortened in length. Furthermore, since an area of the optical device is reduced, it would be possible to increase a yield by which optical devices can be diced out of a wafer.

Figure 27:
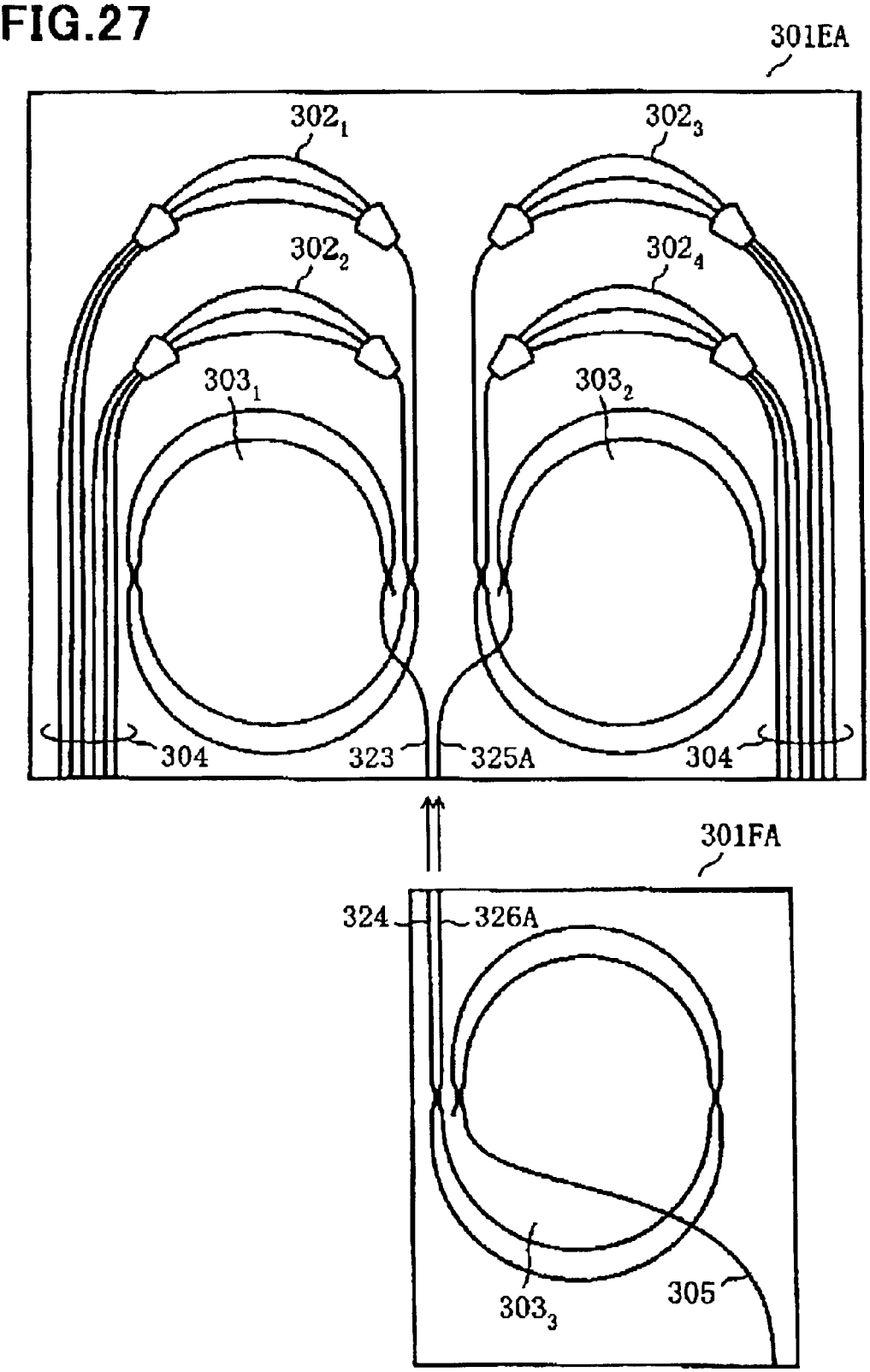
FIG. 27 is a plan view of a variant of an optical device in accordance with the ninth embodiment of the present invention.

FIG. 27 is a plan view of a variant of the optical device illustrated in FIG. 26.

In the optical device illustrated in FIG. 26, since a distance between the waveguides 323 and 325 is relatively long, and further a distance between the waveguides 324 and 326 is also relatively long. Hence, the optical device 301E is accompanied with a problem of expansion and contraction of a substrate because of a temperature.

The optical device illustrated in FIG. 27 solves the problem. That is, a waveguide 325A is located close to the waveguide 323 at a lower edge of the substrate in a first optical device 301EA, and similarly, a waveguide 326A is located close to the waveguide 324 at an upper edge of the substrate in a second optical device 301FA. An interval between the waveguides 323 and 325A is equal to an interval between the waveguides 324 and 326A.

The optical device illustrated in FIG. 27 provides the same advantages as those of the optical device illustrated in FIG. 26. That is, an optical fiber array through which an optical signal is input into the optical device and an optical signal is output from the optical device can be optically connected to the substrate, ensuring reduction in the number of optical fiber arrays.

[Tenth Embodiment]

Figure 28:
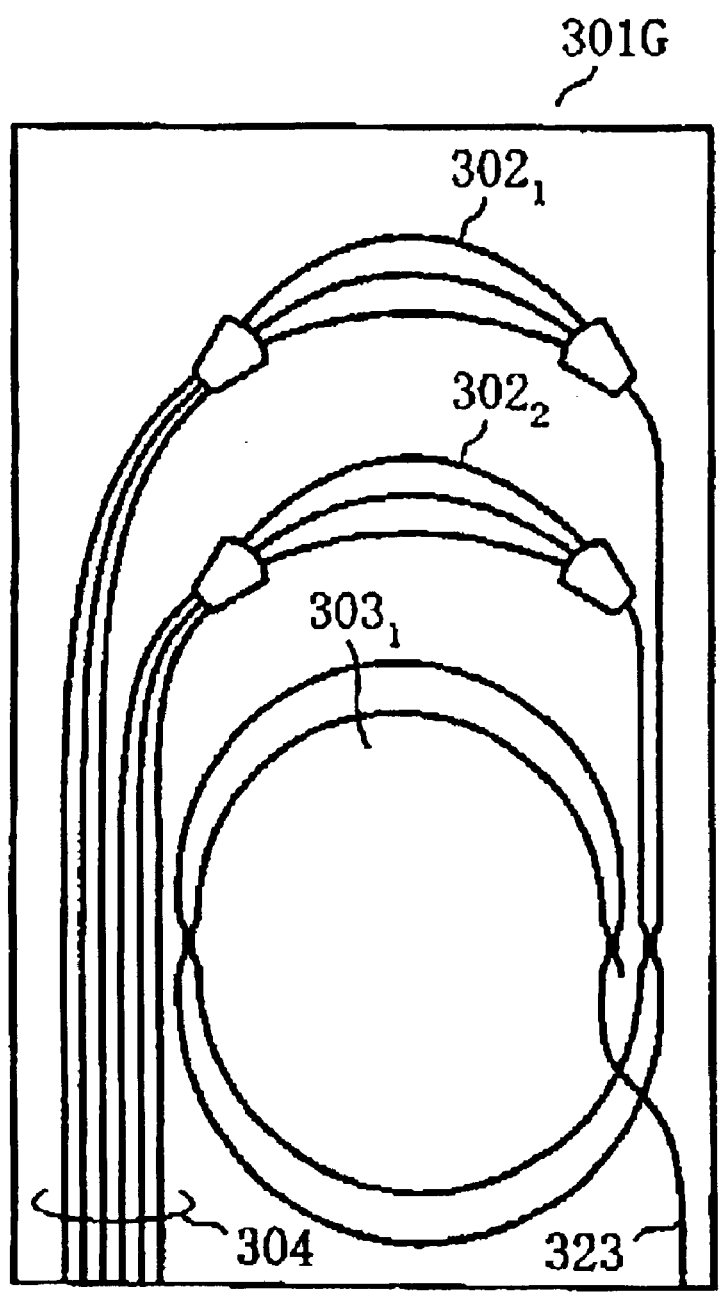
FIG. 28 is a plan view of an optical device in accordance with the tenth embodiment of the present invention.
Figure 29:
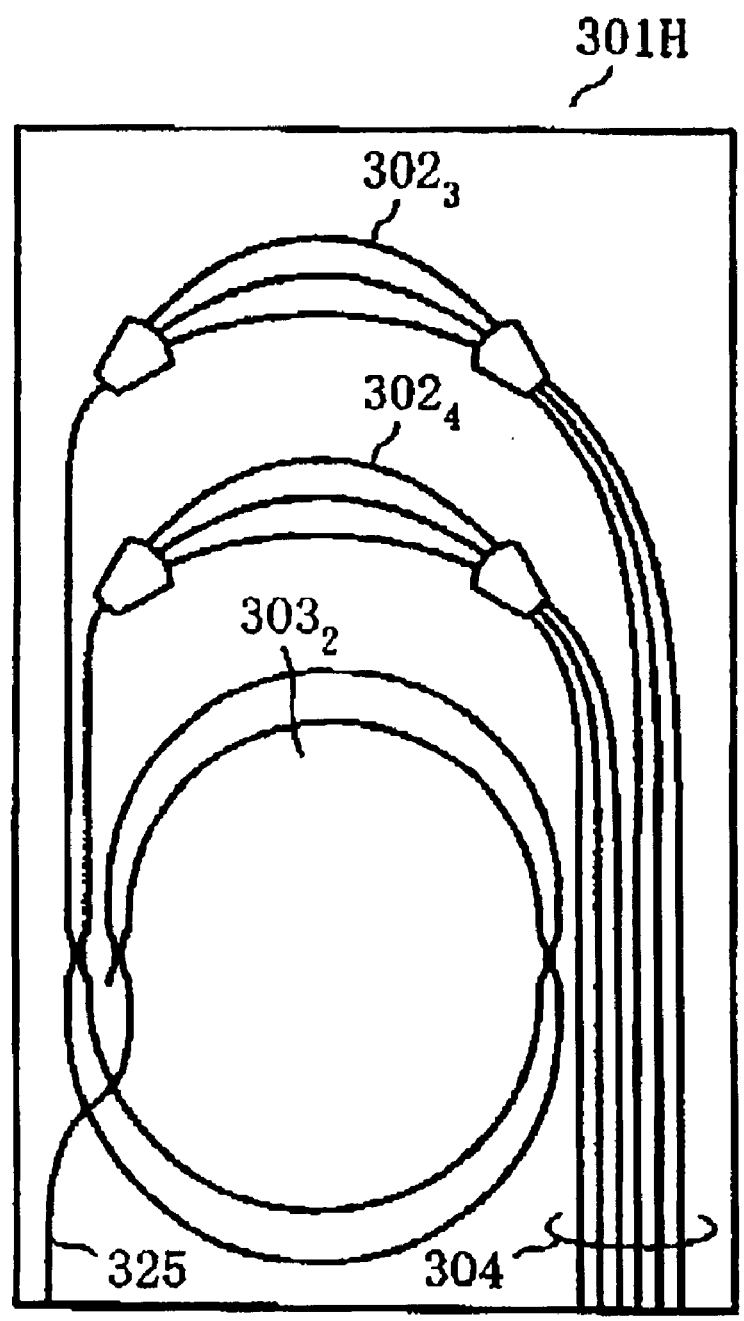
FIG. 29 is a plan view of a variant of an optical device in accordance with the tenth embodiment of the present invention.

FIGS. 28 and 29 are plan views of optical devices in accordance with the tenth embodiment of the present invention.

The optical devices in accordance with the tenth embodiment are obtained by dividing the first optical device 301E illustrated in FIG. 26 into two parts 301G and 301H. In FIGS. 28 and 29, parts or elements that correspond to each other have been provided with the same reference numerals, and operate in the same manner as corresponding parts or elements.

The optical devices 301G and 301H illustrated in FIGS. 28 and 29 may be directly connected as a component to other optical devices such as the second optical device 301F illustrated in FIG. 26, or connected to other optical devices through an optical fiber array (not illustrated).

In addition, since the optical devices including the optical devices 301G and 301H include a plurality of optical circuits arranged in a spiral or a circle, it would be possible to increase a yield and reduce fabrication costs.

Figure 30:
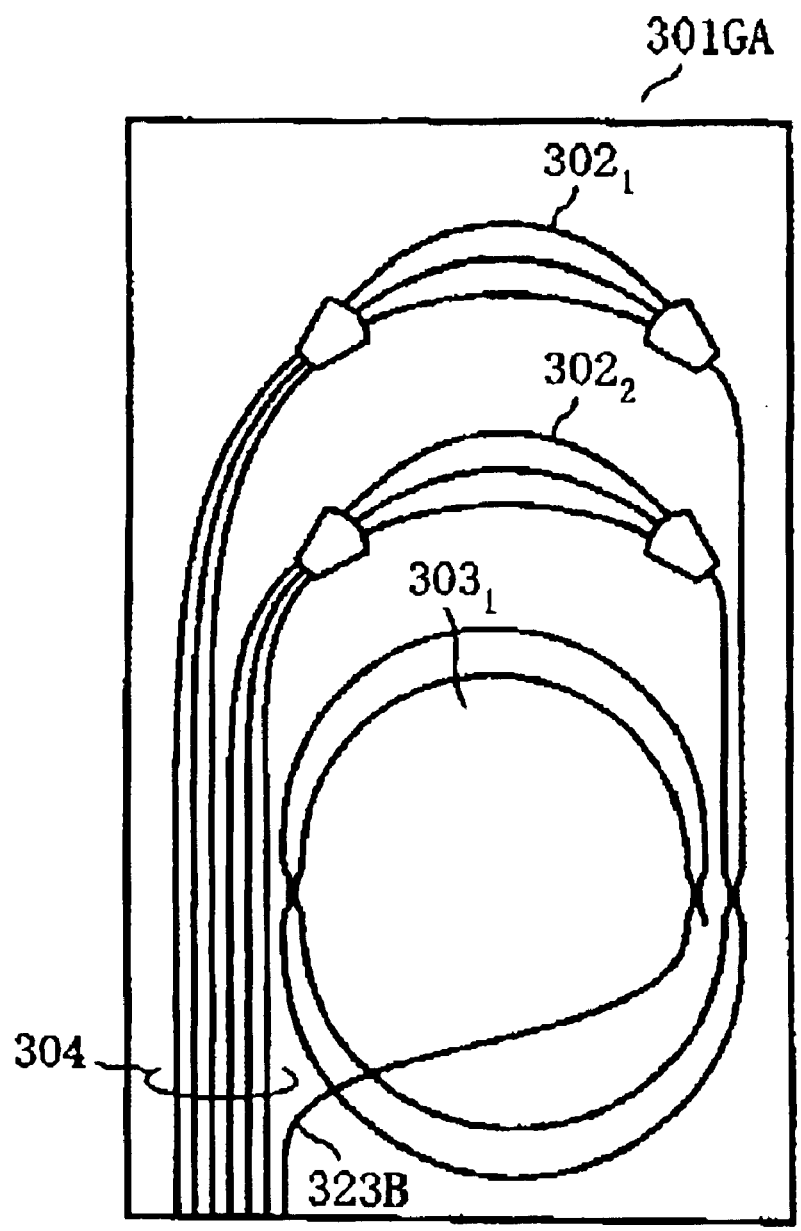
FIG. 30 is a plan view of another variant of an optical device in accordance with the tenth embodiment of the present invention.
Figure 31:
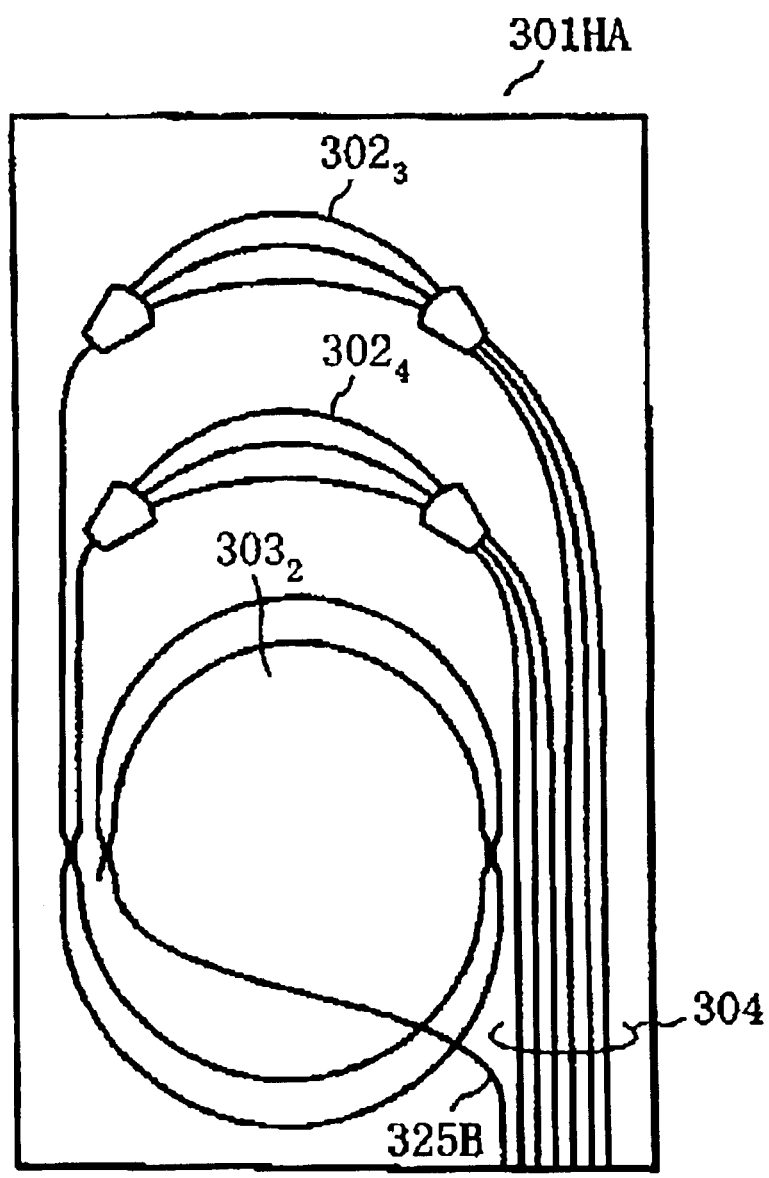
FIG. 31 is a plan view of still another variant of an optical device in accordance with the tenth embodiment of the present invention.

FIGS. 30 and 31 are plan views of variants of the optical devices illustrated in FIGS. 28 and 29. Parts or elements that correspond to those of the optical devices illustrated in FIGS. 28 and 29 have been provided with the same reference numerals, and operate in the same manner as corresponding parts or elements in FIGS. 28 and 29, unless explicitly explained hereinbelow.

In the optical devices 301GA and 301HA illustrated in FIGS. 30 and 31, waveguides 323B and 325B are arranged close to a wave guide 304. Accordingly, the optical devices 301GA and 301HA are hardly influenced by expansion and contraction of a substrate. In addition, an optical fiber array through which an optical signal is input into the optical device and an optical signal is output from the optical device can be optically connected to the substrate, ensuring reduction in the number of optical fiber arrays.

In the above-mentioned first to tenth embodiments, a Mach-Zehnder interferometer type optical circuit is designed to include directional couplers as a coupler. However, it should be noted that a Mach-Zehnder interferometer type optical circuit may be designed to include a multi-mode interference (MMI) coupler in place of a directional coupler, or include both of a MMI coupler and a directional coupler.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Applications Nos. 2001-247431 and 2001-301517 filed on Aug. 16, 2001 and Sep. 28, 2001, respectively, including specification, claims, drawings and summary is incorporated herein by reference in its entirety.

What is claimed is:

1. An optical device including at least one kind of and a plurality of optical circuits optically connected in series wherein at least a part of said optical circuits is arranged in a spiral on a common substrate,
    wherein a waveguide optically connected to an optical circuit located closest to a center of said spiral intersects with other waveguides at an angle of 90 degrees or almost 90 degrees,
    wherein said optical device further comprises an arcuate arrayed waveguide, and
    wherein one of said optical circuits is arranged coaxially with said arcuate arrayed waveguide.

2. An optical device including a plurality of optical circuits including a same structure and optically connected in series wherein at least a part of said optical circuits is arranged in a spiral on a common substrate,
    wherein a waveguide optically connected to an optical circuit located closest to a center of said spiral intersects with other waveguides at an angle of 90 degrees or almost 90 degrees,
    wherein said optical device further comprises an arcuate arrayed waveguide, and
    wherein one of said optical circuits is arranged coaxially with said arcuate arrayed waveguide.

3. An optical device including at least one kind of and a plurality of optical circuits optically connected in series wherein said optical circuits are arranged in a spiral on a common substrate,
    wherein a waveguide optically connected to an optical circuit located closest to a center of said spiral intersects with other waveguides at an angle of 90 degrees or almost 90 degrees, and
    wherein each of said optical circuits comprises a Mach-Zehnder interferometer including a waveguide, and a coupler through which said waveguide is optically connected to a waveguide in a next-stage Mach-Zehnder interferometer, said waveguide defining two arms including different lengths from each other.

4. The optical device as set forth in claim 3, wherein said coupler comprises a directional coupler.

5. The optical device as set forth in claim 3, wherein at least a part of said coupler in one of said optical circuits is arranged to be close to another coupler in another of said optical circuits.

6. The optical device as set forth in claim 5, wherein said couplers are located in a trimming region used for compensating for a characteristic of each of said optical circuits.

7. The optical device as set forth in claim 3, wherein each said waveguide defines a half of said spiral.

8. The optical device as set forth in claim 3, wherein each of said two arms comprises a first quarter-circular portion, a linear portion connected at its first end to said first quarter-circular portion, and a second quarter-circular portion connected to said linear portion at a second end thereof.

9. An optical device including at least one kind of and a plurality of optical circuits optically connected in series wherein said optical circuits are arranged in a spiral on a common substrate,
    wherein each of said optical circuits comprises a Mach-Zehnder interferometer including a waveguide, and a coupler through which said waveguide is optically connected to a waveguide in a next-stage Mach-Zehnder interferometer, said waveguide defining two arms including different lengths from each other, and
    wherein said coupler comprises a multi-mode interference (MMI) coupler.

10. The optical device as set forth in claim 9, further comprising a plurality of phase-shifters through each of which said coupler in an optical circuit is optically connected to said coupler in a next-stage optical circuit, such that said optical device acts as an optical finite impulse response (FIR) filter.

11. An optical device including at least one kind of and a plurality of optical circuits optically connected in series wherein said optical circuits are arranged in a spiral on a common substrate,
    wherein an input waveguide optically connected to a first-stage optical circuit includes an end at an edge of said substrate, and an output waveguide optically connected to a final-stage optical circuit includes an end at the same edge of said substrate as said edge.

12. The optical device as set forth in claim 11, wherein said end of said input waveguide and said end of said output waveguide are arranged close to each other at said edge of said substrate.

13. The optical device as set forth in claim 11, wherein said end of said input waveguide and said end of said output waveguide are equally spaced away from one another.

14. The optical device as set forth in claim 11, further comprising an optical fiber through which an optical signal is input into and output from said optical circuits and which is optically connected to said substrate at said edge.

15. The optical device as set forth in claim 11, wherein said optical device includes a plurality of substrates, an input waveguide optically connected to a first-stage optical circuit includes an end at an edge of each of said substrates, an output waveguide optically connected to a final-stage optical circuit includes an end at the same edge of each of said substrates as said edge, and an input waveguide in a first substrate among said substrates is optically connected to an output waveguide in a second substrate among said substrates.

16. An optical device including at least one kind of and a plurality of optical circuits optically connected in series wherein said optical circuits are arranged in a spiral on a common substrate, wherein a waveguide optically connected to an optical circuit located closest to a center of said spiral intersects with other waveguides at an angle of 90 degrees or almost 90 degrees, and wherein said optical device further comprises a heater electrode for commonly heating optical circuits located adjacent to each other in a radial direction of said spiral.

17. An optical device including at least one kind of and a plurality of optical circuits optically connected in series wherein said optical circuits are arranged in a spiral on a common substrate, wherein a waveguide optically connected to an optical circuit located closest to a center of said spiral intersects with other waveguides at an angle of 90 degrees or almost 90 degrees, and wherein said optical device further an arcuate arrayed waveguide, and wherein one of said optical circuits is arranged coaxially with said arcuate arrayed waveguide.

18. An optical device including a plurality of optical circuits including a same structure and optically connected in series wherein said optical circuits are arranged in a spiral on a common substrate, wherein a waveguide optically connected to an optical circuit located closest to a center of said spiral intersects with other waveguides at an angle of 90 degrees or almost 90 degrees, and wherein each of said optical circuits comprises a Mach-Zehnder interferometer including a waveguide, and a coupler through which said waveguide is optically connected to a waveguide in a next-stage Mach-Zehnder interferometer, said waveguide defining two arms including different lengths from each other.

19. The optical device as set forth in claim 18, wherein said coupler comprises a directional coupler.

20. The optical device as set forth in claim 18, wherein at least a part of said coupler in one of said optical circuits is arranged to be close to another coupler in another of said optical circuits.

21. The optical device as set forth in claim 20, wherein said couplers are located in a trimming region used for compensating for a characteristic of each of said optical circuits.

22. The optical device as set forth in claim 18, wherein each said waveguide defines a half of said spiral.

23. The optical device as set forth in claim 18, wherein each of said two arms comprises a first quarter-circular portion, a linear portion connected at its first end to said first quarter-circular portion, and a second quarter-circular portion connected to said linear portion at a second end thereof.

24. An optical device including a plurality of optical circuits including a same structure and optically connected in series wherein said optical circuits are arranged in a spiral on a common substrate, wherein each of said optical circuits comprises a Mach-Zehnder interferometer including a waveguide, and a coupler through which said waveguide is optically connected to a waveguide in a next-stage Mach-Zehnder interferometer, said waveguide defining two arms including different lengths from each other, and wherein said coupler comprises a multi-mode interference (MMI) coupler.

25. The optical device as set forth in claim 24, further comprising a plurality of phase-shifters through each of which said coupler in an optical circuit is optically connected to said coupler in a next-stage optical circuit, such that said optical device acts as an optical finite impulse response (FIR) filter.

26. An optical device including a plurality of optical circuits including a same structure and optically connected in series wherein said optical circuits are arranged in a spiral on a common substrate, wherein an input waveguide optically connected to a first-stage optical circuit includes an end at an edge of said substrate, and an output waveguide optically connected to a final-stage optical circuit includes ends at the same edge of said substrate as said edge.

27. The optical device as set forth in claim 26, wherein said end of said input waveguide and said end of said output waveguide are arranged close to each other at said edge of said substrate.

28. The optical device as set forth in claim 26, wherein said end of said input waveguide and said end of said output waveguide are equally spaced away from one another.

29. The optical device as set forth in claim 26, further comprising an optical fiber through which an optical signal is input into and output from said optical circuits and which is optically connected to said substrate at said edge.

30. The optical device as set forth in claim 26, wherein said optical device has a plurality of substrates, an input waveguide optically connected to a first-stage optical circuit includes an end at an edge of each of said substrates, an output waveguide optically connected to a final-stage optical circuit includes an end at the same edge of each of said substrates as said edge, and an input waveguide in a first substrate among said substrates is optically connected to an output waveguide in a second substrate among said substrates.

31. An optical device including a plurality of optical circuits including a same structure and optically connected in series wherein said optical circuits are arranged in a spiral on a common substrate, further comprising a heater electrode for commonly heating optical circuits located adjacent to each other in a radial direction of said spiral.

32. An optical device including a plurality of optical circuits including a same structure and optically connected in series wherein said optical circuits are arranged in a spiral on a common substrate, wherein a waveguide optically connected to an optical circuit located closest to a center of said spiral intersects with other waveguides at an angle of 90 degrees or almost 90 degrees, wherein said optical device further comprises an arcuate arrayed waveguide, and wherein one of said optical circuits is arranged coaxially with said arcuate arrayed waveguide.

* * * * *